(12) United States Patent
Mikroulis

(10) Patent No.: US 11,592,266 B2
(45) Date of Patent: Feb. 28, 2023

(54) FIREARM MAGNIFIER, SYSTEM AND METHOD

(71) Applicant: Dimitri Mikroulis, Henderson, NV (US)

(72) Inventor: Dimitri Mikroulis, Henderson, NV (US)

( * ) Notice: Subject to any disclaimer, the term of this patent is extended or adjusted under 35 U.S.C. 154(b) by 49 days.

(21) Appl. No.: 17/116,570

(22) Filed: Dec. 9, 2020

(65) Prior Publication Data
US 2021/0278173 A1    Sep. 9, 2021

Related U.S. Application Data

(60) Provisional application No. 62/946,904, filed on Dec. 11, 2019.

(51) Int. Cl.
*F41G 1/473*    (2006.01)
*F41G 1/38*    (2006.01)

(52) U.S. Cl.
CPC ............... *F41G 1/473* (2013.01); *F41G 1/38* (2013.01)

(58) Field of Classification Search
CPC ................................ F41G 1/473; F41G 1/38
See application file for complete search history.

(56) References Cited

U.S. PATENT DOCUMENTS

| | | | | |
|---|---|---|---|---|
| 1,190,121 A | * | 7/1916 | Critchett | F41G 1/38 212/73 |
| 2,806,287 A | * | 9/1957 | Sullivan | F41G 1/12 33/297 |
| 3,059,338 A | * | 10/1962 | Coeytaux | G02B 23/14 356/29 |
| 3,492,733 A | * | 2/1970 | Leatherwood | G02B 23/14 D16/132 |
| 3,682,552 A | * | 8/1972 | Hartman | G01C 3/04 356/3 |
| 3,782,822 A | * | 1/1974 | Spence | G02B 23/145 359/422 |
| 3,885,861 A | * | 5/1975 | Farnsworth | G02F 1/133 356/252 |
| 3,948,587 A | * | 4/1976 | Rubbert | G01C 3/04 359/422 |
| 4,263,719 A | * | 4/1981 | Murdoch | G02B 23/10 33/297 |
| 4,389,791 A | * | 6/1983 | Ackerman | G01C 3/04 42/122 |

(Continued)

OTHER PUBLICATIONS

PCT Notification of Transmittal of the International Search Report and the Written Opinion of the International Searching Authority, or the Declaration; Feb. 26, 2021; International Application No. PCTUS20/64054; International Searching Authority, United States Patent and Trademark Office.

(Continued)

*Primary Examiner* — Michelle Clement
(74) *Attorney, Agent, or Firm* — The Compton Law Firm, P.C.; Scott D. Compton

(57) ABSTRACT

The present disclosure is directed to a firearm magnifier. A firearm magnifier of the present disclosure is operationally configured for use with an optical sight of a firearm. A firearm magnifier of the present disclosure comprises a reticle operationally configured to range one or more target objects at one or more distances from the reticle.

17 Claims, 20 Drawing Sheets

(56) References Cited

U.S. PATENT DOCUMENTS

| | | | | |
|---|---|---|---|---|
| 4,403,421 | A * | 9/1983 | Shepherd | G02B 23/14 42/122 |
| 4,497,548 | A * | 2/1985 | Burris | G02B 23/14 359/422 |
| 4,531,052 | A * | 7/1985 | Moore | G01C 3/22 235/407 |
| 4,584,776 | A * | 4/1986 | Shepherd | F41G 1/38 33/298 |
| 4,671,165 | A * | 6/1987 | Heidmann | F41G 3/06 235/416 |
| 4,695,161 | A * | 9/1987 | Reed | G02B 23/14 356/255 |
| 4,777,352 | A * | 10/1988 | Moore | G06T 7/60 235/407 |
| 4,936,190 | A * | 6/1990 | Pilcher, II | F41G 3/12 89/41.17 |
| 4,965,439 | A * | 10/1990 | Moore | F41G 3/06 702/158 |
| 5,491,546 | A * | 2/1996 | Wascher | F41G 3/06 356/3 |
| 5,616,903 | A * | 4/1997 | Springer | G01C 3/22 235/414 |
| 5,653,034 | A * | 8/1997 | Bindon | G02B 23/105 33/297 |
| 5,920,995 | A * | 7/1999 | Sammut | G02B 23/145 42/122 |
| 6,032,374 | A * | 3/2000 | Sammut | F41G 3/12 42/130 |
| 6,174,288 | B1 * | 1/2001 | Samuels | F41G 3/12 42/106 |
| 6,269,581 | B1 * | 8/2001 | Groh | F41G 3/06 42/122 |
| 6,357,158 | B1 * | 3/2002 | Smith, III | G02B 23/14 42/130 |
| 6,453,595 | B1 * | 9/2002 | Sammut | G02B 27/32 42/130 |
| 6,516,699 | B2 * | 2/2003 | Sammut | G02B 23/14 89/41.17 |
| 6,591,537 | B2 * | 7/2003 | Smith | G02B 23/14 73/167 |
| 6,681,512 | B2 * | 1/2004 | Sammut | F41G 1/38 42/130 |
| 6,729,062 | B2 * | 5/2004 | Thomas | F41G 1/38 42/130 |
| 6,813,025 | B2 * | 11/2004 | Edwards | F41G 1/38 359/399 |
| 6,871,439 | B1 * | 3/2005 | Edwards | F42B 5/035 42/84 |
| 7,171,775 | B1 * | 2/2007 | Lacorte | F41G 1/38 42/133 |
| 7,171,776 | B2 * | 2/2007 | Staley, III | F41G 1/35 42/142 |
| 7,237,355 | B2 * | 7/2007 | Smith, III | F41G 1/38 42/122 |
| 7,832,137 | B2 * | 11/2010 | Sammut | F41G 3/08 235/404 |
| 7,836,626 | B2 * | 11/2010 | Shepherd | F41G 1/44 42/130 |
| 7,856,750 | B2 * | 12/2010 | Sammut | G02B 23/14 42/130 |
| 7,877,886 | B1 | 2/2011 | Hamilton | |
| 7,937,878 | B2 * | 5/2011 | Sammut | F41G 1/38 89/41.17 |
| 7,946,073 | B1 * | 5/2011 | Buck | F41G 1/473 42/130 |
| 9,068,799 | B1 | 6/2015 | Wu | |
| 9,417,034 | B1 * | 8/2016 | Swan | F41G 11/007 |
| 10,175,029 | B2 * | 1/2019 | Teetzel | F41G 1/30 |
| 10,488,154 | B2 * | 11/2019 | Sammut | F41G 1/473 |
| 2005/0021282 | A1 * | 1/2005 | Sammut | F41G 1/473 702/181 |
| 2006/0236586 | A1 * | 10/2006 | Zaderey | F41G 1/38 42/133 |
| 2007/0044364 | A1 * | 3/2007 | Sammut | F41G 1/38 42/122 |
| 2008/0098640 | A1 * | 5/2008 | Sammut | G02B 27/32 42/122 |
| 2009/0205239 | A1 * | 8/2009 | Smith, III | F41G 1/38 42/122 |
| 2009/0235570 | A1 * | 9/2009 | Sammut | G02B 27/32 235/404 |
| 2011/0089238 | A1 * | 4/2011 | Sammut | F41G 3/06 235/404 |
| 2014/0068993 | A1 | 3/2014 | Mikroulis | |
| 2015/0253108 | A1 * | 9/2015 | Fischer | F41G 3/06 42/122 |
| 2015/0253132 | A1 * | 9/2015 | Senne | F41G 1/473 356/21 |
| 2016/0047626 | A1 * | 2/2016 | Kremer | G03B 17/02 42/119 |
| 2017/0102209 | A1 * | 4/2017 | Byars | G02B 27/32 |
| 2017/0176141 | A1 * | 6/2017 | Kedairy | F41G 1/38 |
| 2019/0145735 | A1 * | 5/2019 | Hancosky | F41G 1/345 42/119 |
| 2021/0223000 | A1 * | 7/2021 | Donahue | F41G 1/14 |
| 2021/0348887 | A1 * | 11/2021 | Connolly | F41G 1/17 |

OTHER PUBLICATIONS

Mikroulis, Claims 1-18 of the International Application No. PCTUS20/64054; Dec. 9, 2020.

* cited by examiner

FIREARM MAGNIFIER, SYSTEM AND METHOD

CROSS-REFERENCE TO RELATED APPLICATIONS

This application claims benefit of U.S. Provisional Patent Application Ser. No. 62/946,904, filed on Dec. 11, 2019, the content of which is hereby incorporated by reference in its entirety.

STATEMENT REGARDING FEDERALLY SPONSORED RESEARCH OR DEVELOPMENT

Not applicable.

BACKGROUND OF THE DISCLOSURE

1. Field of the Invention

This disclosure relates generally to firearm magnifiers for use with firearm optical sights.

2. Background Art

Non-magnifying (1×) electronic optical sights for firearms such as dot sights and the like are typically limited for use by the naked eye out to distances generally of about 91.44 meters (about 100.0 yards) or less. In order to aim at target objects at distances greater than 100.0 yards, firearm users often mount a magnifier behind a non-magnifying (1×) electronic sight to provide a desired magnification of a target object, e.g., up to 10× magnification of a target object. However, commercially available magnifiers are limited to providing magnification only and do not include any aiming marks or other indicia for providing information such as range estimation of a target object.

SUMMARY OF THE DISCLOSURE

The present disclosure is directed to a firearm magnifier comprising a reticle.

The present disclosure is also directed to a firearm magnifier of a firearm sighting system, comprising a reticle operationally configured to range one or more target objects in a manner effective to determine an aiming point of a reticle of an optical sight of the firearm sighting system for the one or more target objects.

The present disclosure is also directed to a firearm magnifier comprising a reticle operationally configured to auto range one or more targets at one or more distances from the reticle.

DEFINITIONS USED IN THE DISCLOSURE

Figure 1:
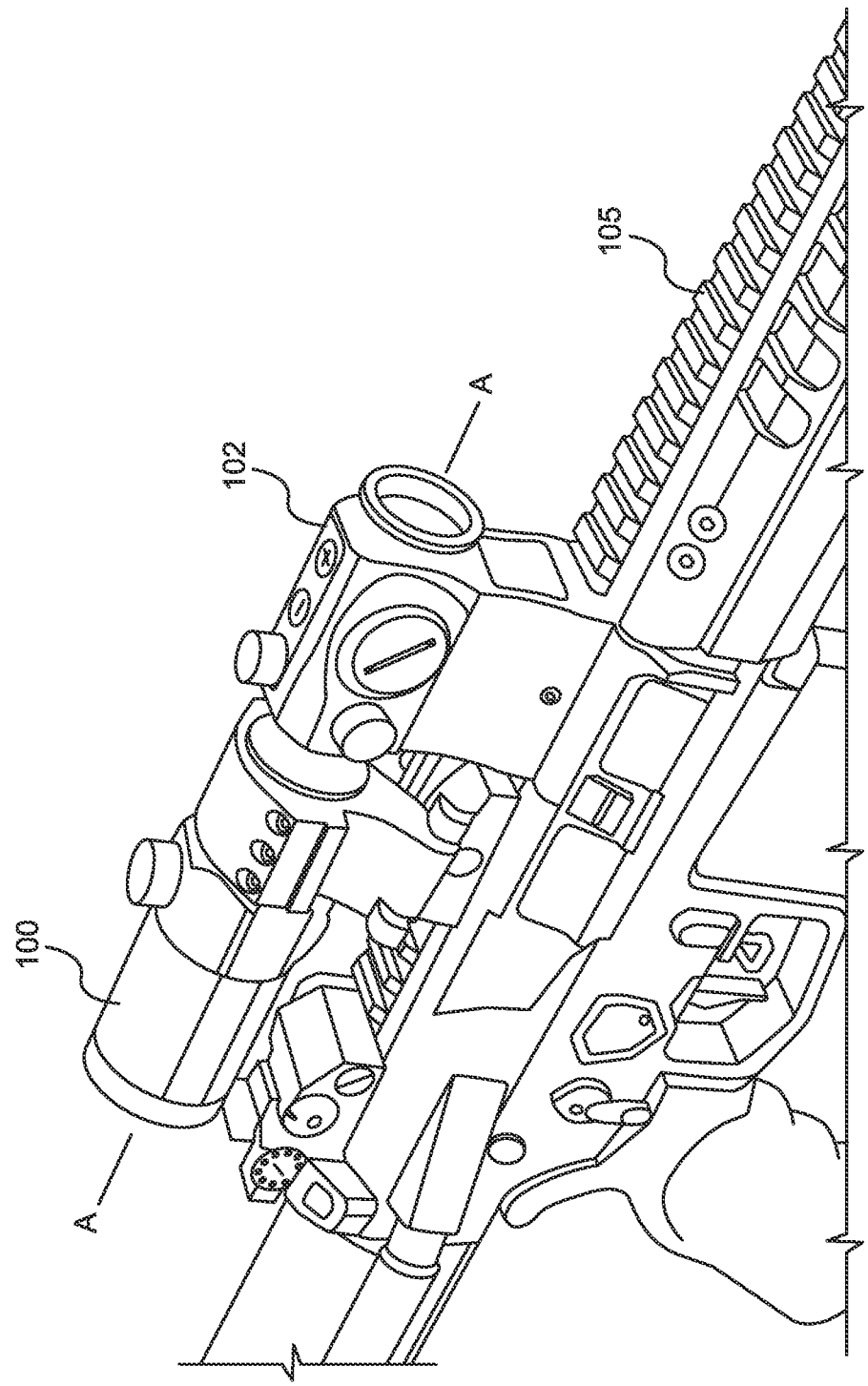
FIG. 1 is a perspective partial view of an exemplary firearm and firearm sighting system including a firearm optical sight and a firearm magnifier secured to the firearm.

The term "at least one", "one or more", and "one or a plurality" mean one thing or more than one thing with no limit on the exact number; these three terms may be used interchangeably within this disclosure. For example, at least one device means one or more devices or one device and a plurality of devices.

The term "about" means that a value of a given quantity is within ±20% of the stated value. In other embodiments, the value is within ±15% of the stated value. In other embodiments, the value is within ±10% of the stated value. In other embodiments, the value is within ±7.5% of the stated value. In other embodiments, the value is within ±5% of the stated value. In other embodiments, the value is within ±2.5% of the stated value. In other embodiments, the value is within ±1% of the stated value.

The term "substantially" or "essentially" means that a value of a given quantity is within ±10% of the stated value. In other embodiments, the value is within ±7.5% of the stated value. In other embodiments, the value is within ±5% of the stated value. In other embodiments, the value is within ±2.5% of the stated value. In other embodiments, the value is within ±1% of the stated value. In other embodiments, the value is within ±0.5% of the stated value. In other embodiments, the value is within ±0.1% of the stated value.

DETAILED DESCRIPTION OF THE DISCLOSURE

For the purposes of promoting an understanding of the principles of the disclosure, reference is now made to the embodiments illustrated in the drawings and particular language will be used to describe the same. It is understood that no limitation of the scope of the claimed subject matter is intended by way of the disclosure. As understood by one skilled in the art to which the present disclosure relates, various changes and modifications of the principles as described and illustrated are herein contemplated.

Before describing the disclosure in detail, it is to be understood that a firearm sighting system, firearm magnifier, and method of this disclosure are not limited to particular embodiments. It is also to be understood that the terminology used herein is for the purpose of describing particular embodiments only, and is not intended to be limiting. Herein, a firearm user may also be referred to as a "firearm shooter," "shooter" or "firearm operator." In this disclosure a "target object" may include, but is not necessarily limited to one or more inanimate objects of a known or predetermined size or average size, one or more members of the Animalia Kingdom of a known or predetermined size or average size, and combinations thereof. One exemplary target object may include an "enemy combatant" such as a human being or other target having the general size and shape or silhouette of a human being or part of a human being as understood by persons of ordinary skill in the art of firearm target shooting. Without limiting the disclosure, other exemplary members of the Animalia Kingdom suitable as target objects may include predators, large game and small game in hunting type applications, e.g., bears, big cats, elk, moose, deer, boar, rabbits, fowl. Herein, the "average center mass" of an enemy combatant includes the width of an enemy combatant shoulder to shoulder, or at least the width of the torso or chest region when the enemy combatant is directly facing a firearm magnifier of this disclosure or when an enemy combatant is directly facing the opposite direction away from a firearm magnifier of this disclosure. For purposes of this disclosure, the average center mass of an enemy combatant includes a width of or about 0.46 m (about 18.0 inches).

In regard to firearm use, one system of measurement known to the skilled artisan includes the International System of Units. Another known system of measurement for firearm use includes the United States customary units. Herein, the International System of Units may be referred to as "metric units" and the United States customary units may be referred to as "U.S. units."

Herein "mph" stands for miles per hour and "mps" stands for to meters per second. Herein "km/h" stands for kilometers per hour. The phrase "time on target" refers to the time required for a firearm shooter to realize an aiming point of a given round ("target acquisition") to a particular target in real time. The phrase "inanimate object" is not limited to any particular object or type of object but is meant to be non-limiting and may include one or more objects found in nature and/or one or more manmade inanimate objects. Non-limiting examples of manmade inanimate objects may include, but are not necessarily limited to land vehicles, military vehicles, building type structures, window glass, shooting targets, nautical vessels, flying machines such as airplanes, drones, helicopters, sources of light or lighting, storage containers such as liquid storage containers and dry bulk containers, machinery and equipment.

Herein, the terms "automatic" and "auto" may be used interchangeably. In reference to a magnifier reticle of the present disclosure, the terms "automatic ranging," "auto range," "auto ranging," and like terms, refer to a magnifier reticle wherein at least part of the magnifier reticle is operationally configured to horizontally range and/or vertically range one or more targets located at one or more distances from the magnifier reticle without the use of or without making range calculations. Herein, a combination of a particular cartridge and firearm chambered for the cartridge may be referred to as a "firearm/ammo combination."

A non-magnifying (1×) electronic optical sight ("optical sight") such as a dot sight may include a commercially available reflex sight, tube sight, prismatic sight, or holographic sight. As understood by the skilled artisan, the difference in these types of dot sights relates to how the sight works to project a reticle of the sight. For example, reflex sights and tube sights typically use a reflective glass lens and one or more light sources such as one or more light emitting diodes ("LEDs") and/or one or more resonant cavity light-emitting diodes ("RCLEDs") to project a reticle onto the lens. Prismatic sights use prisms and holographic sights use a laser. One non-limiting commercial example of a dot sight includes the Primary Arms® Classic Series Gen II Removable Microdot Red Dot Sight commercially available from Primary Arms, L.L.C., Houston, Tex., U.S.A. Herein, a "dot" of a "dot sight" may refer to any shape reticle of one or more indicia as desired and need not necessarily include one or more indicia of circular or substantially circular form.

Herein, "MOA" refers to Minutes of Angle, which is an angular measurement wherein one minute of angle is equal to $\frac{1}{60}$ of a degree. Herein, "MIL" or "MRAD" is a shortening of the term milliradian and "MILS" and "MRADs" is a shortening of milliradians. A milliradian is an angular measurement wherein a milliradian is a thousandth of a radian. There are 6.283 radians in a circle, which equates to 6283.0 milliradians in a circle. For purposes of this disclosure, "milliradian," "MIL" and "MRAD" can be used interchangeably. Likewise, "milliradians," "MILs" and "MRADs" may be used interchangeably.

In one embodiment, the present disclosure is directed to a magnifier for a firearm, the magnifier comprising a reticle. In one embodiment, a magnifier reticle of this disclosure is operationally configured to provide automatic calculation free ranging of one or more target objects according to one or more known measurements of one or more target objects. In one embodiment, a magnifier reticle of this disclosure is operationally configured to provide automatic calculation free horizontal ranging of one or more target objects according to a known width for one or more target objects. In one embodiment, a magnifier reticle of this disclosure is operationally configured to provide automatic calculation free vertical ranging of one or more target objects according to a known height for one or more target objects. In one embodiment, a magnifier reticle of this disclosure is operationally configured to provide automatic calculation free horizontal and vertical ranging of one or more target objects according to a known width and a known height for one or more target objects. In one embodiment, a magnifier reticle of this disclosure is operationally configured to provide automatic calculation free horizontal and vertical ranging of one or more target objects according to a known width and a known height for an enemy combatant.

In another embodiment, the present disclosure is directed to a firearm magnifier comprising a reticle, the reticle having a first scale comprising one or more horizontal marks operationally configured to horizontally auto range one or more target objects at one or more designated distances from the reticle according to a known average size for the one or more target objects. In one embodiment, the reticle includes a second scale operationally configured as a lower alignment mark for the one or more target objects, wherein the first scale is operationally configured as an upper alignment mark for the one or more target objects effective to vertically auto range the one or more target objects at the one or more designated distances from the reticle. In one embodiment, the second scale includes a horizontal member comprising one or more marks employing angular units of measurement and a vertical member comprising one or more marks employing angular units of measurement. In one embodiment, the one or more marks of the horizontal member are operationally configured for horizontal measuring of the one or more target objects and the one or more marks of the vertical member are operationally configured for vertical measuring of the one or more target objects.

In another embodiment, the present disclosure is directed to a firearm magnifier comprising a reticle, the reticle having one or more horizontal marks operationally configured to horizontally auto range one or more target objects according to a known average size for the one or more target objects. In one embodiment, each of the one or more horizontal marks comprises a distinct width corresponding to a designated distance from the reticle, wherein the reticle includes a first horizontal mark defining a minimum horizontal auto ranging distance of the reticle and a second horizontal mark defining a maximum horizontal ranging distance of the reticle. In one embodiment, the first horizontal mark is an uppermost horizontal mark of the reticle.

In another embodiment, the present disclosure is directed to a firearm magnifier comprising a reticle operationally configured to auto range one or more targets in U.S. units.

In another embodiment, the present disclosure is directed to a firearm magnifier comprising a reticle operationally configured to auto range one or more targets in metric units.

In another embodiment, the present disclosure is directed to a firearm magnifier of a firearm sighting system comprising a reticle operationally configured to range one or more target objects in a manner effective to determine an aiming point of a reticle of an optical sight of the firearm sighting system for the one or more target objects. In one embodiment, the firearm magnifier comprises a fixed magnification of 1.5× or more.

In another embodiment, the present disclosure is directed to a firearm magnifier comprising a reticle operationally configured to auto range one or more targets at one or more distances from the reticle. In one embodiment, the reticle comprises one or more marks operationally configured to auto range one or more target objects according to a known average width for the one or more target objects. In one embodiment, the reticle comprises one or more marks operationally configured to auto range one or more target objects according to a known average height for the one or more target objects.

In another embodiment, the disclosure is directed to a firearm sighting system comprising a firearm optical sight and a firearm magnifier comprising a reticle. In another embodiment, a firearm sighting system of this disclosure may comprise a firearm optical sight comprising a reticle and a firearm magnifier comprising a reticle.

In another embodiment, the disclosure is directed to a firearm sighting system including a firearm optical sight comprising a reticle and a firearm magnifier comprising a reticle, wherein the reticle of the firearm magnifier is operationally configured to range one or more target objects in a manner effective to determine an aiming point of the reticle of the firearm optical sight for the one or more target objects.

In another embodiment, the disclosure is directed to a method for enhancing or improving the use of an optical sight for a firearm including providing a magnifier operationally configured to provide information to a firearm shooter that may be applied to operation of the optical sight when aiming and firing one or more projectiles at one or more target objects as viewed through the magnifier and corresponding optical sight of a firearm.

In another embodiment, the disclosure is directed to a firearm magnifier comprising a reticle. In one implementation, the firearm magnifier may be used as part of a firearm sighting system including a firearm and an optical sight including, but not necessarily limited to a dot sight. In one embodiment, the reticle of the firearm magnifier is operationally configured to range a height and/or center mass of one or more target objects and includes angular units of measurement for range estimation, e.g., MIL, MOA.

In another embodiment, the disclosure is directed to a firearm magnifier comprising a reticle comprising one or more aiming marks and/or one or more ranging marks.

In another embodiment, the disclosure is directed to a firearm sighting system comprising (1) a firearm optical sight comprising a reticle having one or more pre-set parameters including, but not necessarily limited to bullet drop compensation information ("BDC"), wind adjustment information, target travel lead information, and combinations thereof, and (2) a firearm magnifier comprising a reticle having one or more pre-set parameters including, but not necessarily limited to horizontal range estimation information and/or vertical range estimation information operationally configured for use with the one or more pre-set parameters of the reticle of the optical sight. The magnifier reticle may also employ angular units of measurement, e.g., MIL, MOA, for ranging one or more target objects of a known size, i.e., a known height and/or a known width for one or more target objects.

In another embodiment, the present disclosure provides a firearm magnifier including a reticle incorporating MILs operationally configured to range height and/or center mass of one or more target objects.

In another embodiment, the disclosure provides a firearm magnifier including a reticle incorporating MOAs operationally configured to range height and/or center mass of one or more target objects.

In another embodiment, the disclosure provides a firearm system including a firearm, a firearm optical sight comprising a reticle and a firearm magnifier comprising a reticle, whereby the reticle of the firearm optical sight and the reticle of the firearm magnifier may be used cooperatively for ranging, aiming and firing one or more rounds at one or more target objects viewed through the firearm magnifier and firearm optical sight combination. In one embodiment, a reticle of a firearm magnifier may be operationally configured to range one or more target objects when viewed through a combination of the firearm magnifier and corresponding firearm optical sight.

In another embodiment, the disclosure provides a firearm optic system including a red dot sight and a firearm magnifier, wherein the firearm magnifier comprises a reticle operationally configured to range one or more target objects observed or viewed by a user through the firearm magnifier and the red dot sight.

In another embodiment, the disclosure provides a firearm sighting system including an optical sight and a firearm magnifier operationally configured to range an enemy combatant horizontally and/or vertically according to the height and/or the width of an enemy combatant.

In another embodiment, the disclosure provides a firearm system including a firearm, a firearm magnifier comprising a reticle, and a firearm optical sight comprising a reticle.

In another embodiment, the disclosure provides a method of aiming a firearm at one or more target objects, comprising (1) providing a firearm system including a firearm, a firearm magnifier comprising a first reticle, and a firearm optical sight comprising a second reticle; (2) auto ranging a target object using the first reticle; (3) aiming the firearm at the target object using the second reticle.

In another embodiment, the disclosure provides a firearm sighting system including a firearm optical sight and a firearm magnifier comprising a reticle operationally configured to range one or more target objects using metric units and/or U.S. units. For example, the present disclosure may provide for range estimation of one or more target objects at one or more distances including, but not necessarily limited to the distances provided in Tables 1 and 2 below.

TABLE 1

| Distance (Meters) | Distance (Yards) |
|---|---|
| 50.0 | 54.7 |
| 100.0 | 109.4 |
| 200.0 | 218.7 |
| 300.0 | 328.1 |
| 400.0 | 437.4 |
| 500.0 | 546.8 |
| 600.0 | 656.2 |
| 700.0 | 765.5 |
| 800.0 | 874.9 |

TABLE 2

| Distance (Meters) | Distance (Yards) |
|---|---|
| 45.7 | 50.0 |
| 91.44 | 100.0 |
| 182.9 | 200.0 |
| 274.3 | 300.0 |
| 365.8 | 400.0 |
| 457.2 | 500.0 |
| 548.6 | 600.0 |
| 640.1 | 700.0 |
| 731.5 | 800.0 |

With reference to FIG. 1, a firearm sighting system of the present disclosure includes a firearm magnifier 100 (hereafter "magnifier 100") and an optical sight 102 mountable to a firearm 105 in a manner effective for the magnifier 100 to magnify an image in a field of view of the optical sight 102. A magnifier 100 of this disclosure is advantageous in that, in addition to providing magnification to a corresponding optical sight 102, the magnifier 100 is operationally configured to provide range estimation information for accurate aiming of a firearm 105 at one or more target objects. For example, in one embodiment a magnifier 100 of this disclosure may comprise a reticle operationally configured to horizontally range one or more target objects at one or more distances according to a predetermined or known average width for one or more target objects and/or vertically range one or more target objects at one or more distances according to a predetermined or known average height for one or more target objects. As described below, a magnifier 100 of this disclosure may comprise a reticle operationally configured to employ angular units of measurement effective to horizontally and/or vertically range one or more target objects. In addition, a magnifier 100 may be secured to a firearm 105 via one or more mounts known in the art, i.e., a right side mount, a left side mount, a multi-position mount, e.g., a swing mount, a flip type mount such as a flip-to-side mount.

Figure 2:
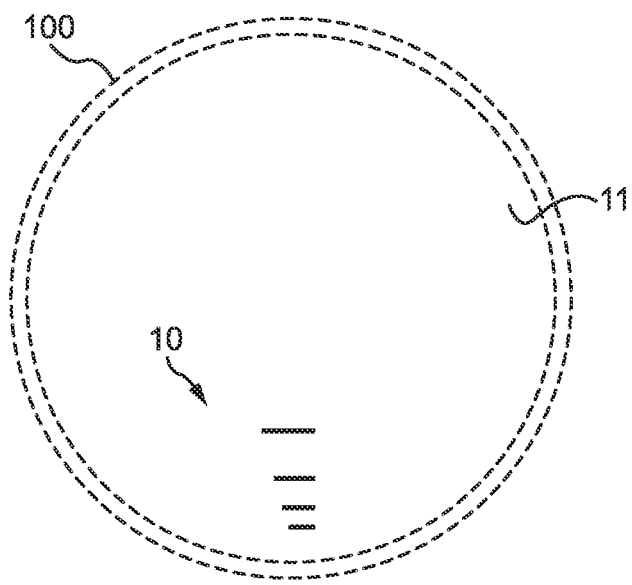
FIG. 2 is a front view illustrating an embodiment of a magnifier reticle of the present disclosure.
Figure 3:
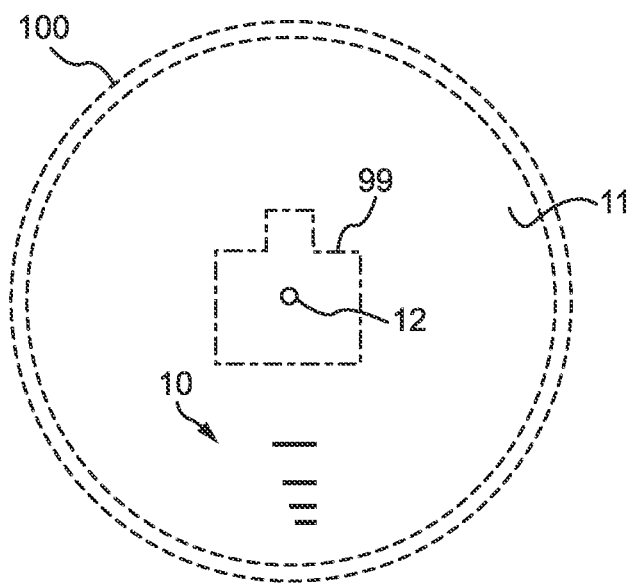
FIG. 3 is a demonstrative sight picture of an embodiment of a firearm sighting system of the present disclosure including the magnifier reticle of FIG. 2 and a front view of an embodiment of an optical reticle of an optical sight of the firearm sighting system.

As shown in FIG. 2, in one embodiment a magnifier 100 of this disclosure may comprise a reticle (hereafter referred to as a "magnifier reticle 10" or "first reticle 10") on a lens 11 of the magnifier 100 in a manner effective for use as a ranging reticle and/or as an aiming reticle of a firearm sighting system. In the embodiment of FIG. 2, the magnifier reticle 10 is disposed along a bottom center location on the lens 11 in an off-center location of the lens 11. In another embodiment, a magnifier reticle 10 may be disposed along a different part of a lens 11 other than the bottom center of the lens 11 including a center point of a lens 11. Suitably, the location and/or size of the magnifier reticle 10 as viewed on a lens 11 is effective for operation with an aiming reticle of a corresponding optical sight 102 (hereafter referred to as an "optical reticle 12" or a "second reticle 12") of a firearm sighting system. For example, at an operable field of view an optical sight 102 such as a dot sight typically includes an optical reticle 12 viewed by a shooter as being located at or near a center point on a lens of the optical sight 102. As such, in one embodiment a magnifier reticle 10 may be located on a lens 11 so as to be viewed off center or offset from a corresponding optical reticle 12 as shown in FIG. 3, which illustrates an optical reticle 12 located behind the lens 11 of the magnifier 100 at a position viewed as being center located above the magnifier reticle 10. In one embodiment, the magnifier 100 may be axially aligned with the optical sight 102 (see optical axis A-A of the optical sight 102 in FIG. 1) providing a sight picture as shown in FIG. 3. In another embodiment, a magnifier 100 may be adjusted in a manner effective to position a magnifier reticle 10 at a location other than bottom center of a lens 11 as shown. For example, a magnifier 100 may be adjusted so that an optical axis B-B of the magnifier 100 is directed to a non-axial position with respect to optical axis A-A effective to locate the magnifier reticle 10 at a desired offset position with respect to the optical reticle 12. In one non-limiting example, a magnifier 100 may be adjusted in a manner effective to locate a magnifier reticle 10 in a sight picture to the left, to the right or above an optical reticle 12 of an optical sight 102. And although a magnifier reticle 10 may be positioned so as to cover at least part of an optical reticle 12 in a particular sight picture, i.e., wherein at least part of an optical reticle 12 is located directly behind at least part of a magnifier reticle 10, suitably, a magnifier reticle 10 is wholly offset from an optical sight 102 as depicted in FIG. 3.

Figure 4:
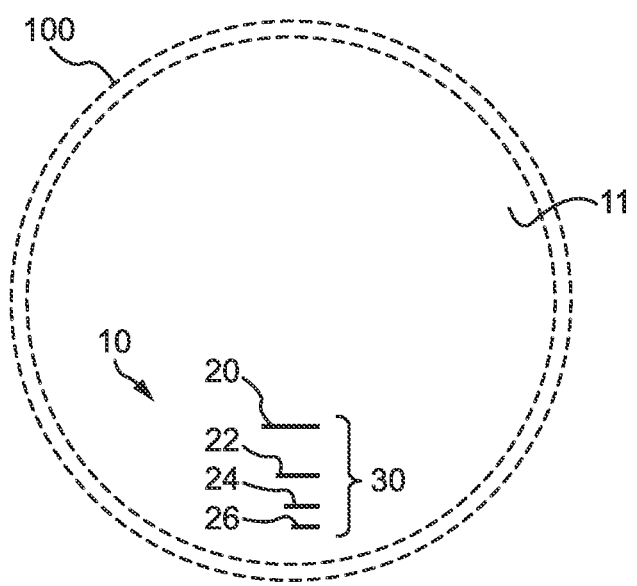
FIG. 4 is another front view of the magnifier reticle of FIG. 2.

In one embodiment, a magnifier reticle 10 of this disclosure may include one or more horizontal marks or indicia operationally configured to horizontally auto range one or more target objects according to a known average size or width for one or more target objects. As shown in FIG. 4, a magnifier reticle 10 of this disclosure may include one or more horizontal first marks 20, 22, 24, 26 provided as a first scale 30 of a magnifier reticle 10 wherein each of the one or more horizontal first marks 20, 22, 24, 26 includes a different or distinct width corresponding to a designated distance from the magnifier reticle 10 for horizontal auto range estimation of one or more target objects including, but not necessarily limited to an enemy combatant 99. Suitably, the one or more horizontal first marks 20, 22, 24, 26 are sized and spaced apart as necessary to auto range one or more target objects at varying designated distances. As such, the width of each of the one or more horizontal first marks 20, 22, 24, 26 and the spacing between each of the one or more horizontal first marks 20, 22, 24, 26 on a lens 11 of a magnifier 100 may vary according to the designated horizontal ranging distances employed for a particular magnifier reticle 10 and/or according to a known average width for one or more particular target objects. The total number of horizontal first marks to be included as part of a magnifier reticle 10 of this disclosure may vary as desired or as otherwise required for one or more magnifier 100 operations.

Referring to FIG. 4, in one embodiment a magnifier reticle 10 may include a horizontal first mark 20 defining a minimum horizontal ranging distance of the first scale 30 and a horizontal first mark 26 defining a maximum horizontal ranging distance of the first scale 30. Accordingly, the horizontal first mark 20 comprises a greater width than the horizontal first mark 26. In this embodiment, the horizontal first mark 20 is provided as an uppermost horizontal first mark of the first scale 30 and the horizontal first mark 26 is provided as s bottommost horizontal first mark of the first scale 30. In another embodiment, the horizontal first mark 20 may be provided as the bottommost horizontal first mark and the horizontal first mark 26 may be provided as an uppermost horizontal first mark of the first scale 30. In other words, the first scale 30 may comprise one or more horizontal first marks 20, 22, 24, 26 top to bottom in ascending order or descending order according to the designated horizontal ranging distance of each of the one or more horizontal first marks 20, 22, 24, 26. In another embodiment, a horizontal first mark defining a minimum horizontal ranging distance and/or a maximum horizontal ranging distance of the first scale 30 may be provided as an intermediate horizontal first mark of the first scale 30.

Non-limiting examples of horizontal ranging distances for a first scale 30 of a magnifier reticle 10 are provided in Tables 3-5 below. For example, a first scale 30 as shown FIG. 4 may include a horizontal first mark 20 comprising a width corresponding to horizontal ranging of a target object 99 at a distance from the magnifier reticle 10 of 300.0 meters and a horizontal first mark 26 comprising a width corresponding to horizontal ranging of a target object 99 at a distance from the magnifier reticle 10 of 600.0 meters. As understood by the skilled artisan, other first scale 30 horizontal ranging distances may be employed other than as provided in Tables 3-5 according to one or more predetermined scenarios of use of a firearm sighting system of this disclosure. For example, the horizontal ranging distances of a first scale 30 may be based on a particular type of target object 99 and/or the anticipated scenarios in which such target object 99 may be encountered when using the magnifier reticle 10.

TABLE 3

| First Scale 30 | Horizontal Ranging Distance in Meters |
| --- | --- |
| Horizontal First Mark 20 | 300.0 |
| Horizontal First Mark 22 | 400.0 |
| Horizontal First Mark 24 | 500.0 |
| Horizontal First Mark 26 | 600.0 |

TABLE 4

| First Scale 30 | Horizontal Ranging Distance in Yards |
| --- | --- |
| Horizontal First Mark 20 | 300.0 |
| Horizontal First Mark 22 | 400.0 |
| Horizontal First Mark 24 | 500.0 |
| Horizontal First Mark 26 | 600.0 |

TABLE 5

| First Scale 30 | Horizontal Ranging Distance in Yards |
| --- | --- |
| Horizontal First Mark 20 | 400.0 |
| Horizontal First Mark 22 | 500.0 |
| Horizontal First Mark 24 | 600.0 |
| Horizontal First Mark 26 | 700.0 |

Although the position of each of the one or more horizontal first marks 20, 22, 24, 26 may vary left to right on a lens 11 of a magnifier 100, for ease of aligning each of the one or more horizontal first marks 20, 22, 24, 26 with a target object 99 viewed through a firearm sighting system, in one embodiment the one or more horizontal first marks 20, 22, 24, 26 may be aligned right as shown in FIG. 4 with a left edge of each first mark terminating at a point according to its width. As such, the right edge of each of the one or more horizontal first marks 20, 22, 24, 26 may be used as an initial alignment point for aligning each of the one or more horizontal first marks 20, 22, 24, 26 with one or more target objects 99. In another embodiment, the one or more horizontal first marks 20, 22, 24, 26 may be aligned left with a right edge of each horizontal first mark terminating at a point according to its width.

Figure 5:
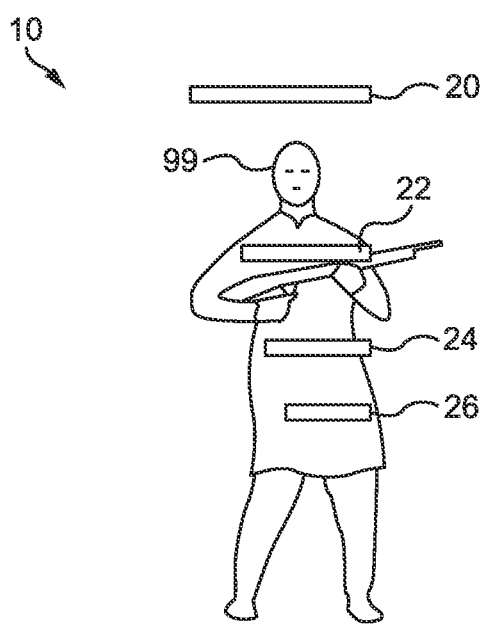
FIG. 5 is a front view of the magnifier reticle of FIG. 2 including an enemy combatant located behind the magnifier reticle in a standing position facing the magnifier reticle.
Figure 6:
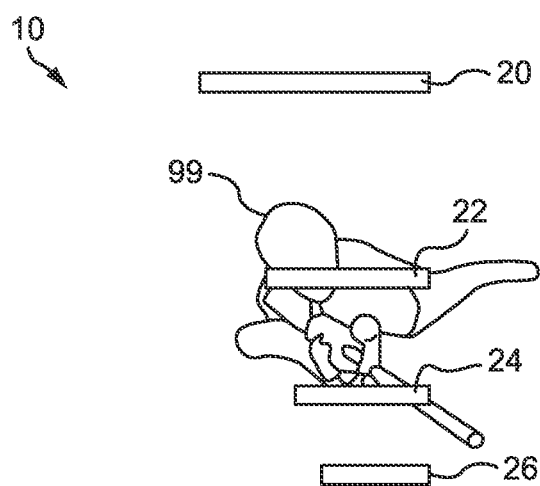
FIG. 6 is another front view of the magnifier reticle of FIG. 2 including an enemy combatant located behind the magnifier reticle in a lying position chest down facing the magnifier reticle.

In one embodiment, the magnifier reticle 10 of FIG. 4 may be used to horizontally auto range one or more target objects including one or more enemy combatants 99 at one or more designated distances when the one or more enemy combatants 99 are oriented for shoulder to shoulder horizontal ranging using the one or more horizontal first marks 20, 22, 24, 26. For example, as shown in FIG. 5, the magnifier reticle 10 of this embodiment may be operationally configured to horizontally auto range one or more enemy combatants 99 according to the average center mass for an enemy combatant 99 when the one or more enemy combatants 99 are oriented in a standing position or other upright position when facing a magnifier reticle 10 as shown or when facing away from the magnifier reticle 10 in an opposite direction. Another suitable upright position includes, but is not necessarily limited to an enemy combatant 99 positioned on his/her knees with his/her head and torso in an upright position when facing a magnifier reticle 10 or facing away in an opposite direction. As shown in FIG. 6, the magnifier reticle 10 of this embodiment is also operationally configured to horizontally auto range one or more enemy combatants 99 oriented in a lying position facing the magnifier reticle 10 chest down as shown or oriented chest up in another scenario or facing away chest down or chest up in an opposite direction.

In operation, the horizontal first mark of the first scale 30 that comprises a width most similar to the shoulder to shoulder width of a targeted enemy combatant 99 is the horizontal first mark used for purposes of horizontal ranging of the enemy combatant 99. In the illustration of FIG. 5, the horizontal first mark 22 comprises a width most similar to the shoulder to shoulder width of the enemy combatant 99. For purpose of example, where the magnifier reticle 10 of FIG. 5 comprises the horizontal ranging distances as described in Table 4, the enemy combatant 99 is estimated to be a distance of or about 400.0 yards from the magnifier reticle 10. In another embodiment, a magnifier reticle 10 may be operationally configured to horizontally auto range an enemy combatant 99 according to a different average width of the enemy combatant 99, e.g., an average width of the head of an enemy combatant 99 or an average width of the waist of an enemy combatant 99.

In a scenario where the shoulder to shoulder width of an enemy combatant 99 does not match the width of a particular horizontal first mark, the horizontal first mark closest in width to the shoulder to shoulder width of the enemy combatant 99 may be used for purposes of horizontal range estimation whereby a shooter may estimate the distance to the enemy combatant 99. For example, in an embodiment of a magnifier reticle 10 as shown in FIG. 5 comprising the horizontal ranging distances as described in Table 4, if the shoulder to shoulder width of an enemy combatant 99 is slightly greater than horizontal first mark 22, a shooter may estimate the enemy combatant 99 to be a distance of or about 380.0 yards from the magnifier reticle 10. If the shoulder to shoulder width of the enemy combatant 99 is about equal in width to a midpoint width between two adjacent horizontal first marks, a shooter may estimate the enemy combatant 99 to be a distance of or about equal to a midpoint distance of the two adjacent horizontal first marks. For example, if the shoulder to shoulder width of an enemy combatant 99 is about equal in width to a midpoint width between horizontal first marks 20 and 22, a shooter may estimate the enemy combatant 99 to be a distance of or about 350.0 yards from the magnifier reticle 10.

Figure 7:
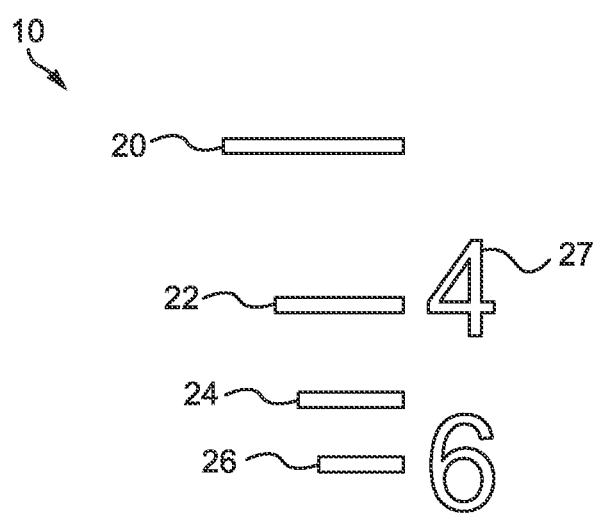
FIG. 7 is a front view of another embodiment of a magnifier reticle of the present disclosure.
Figure 8:
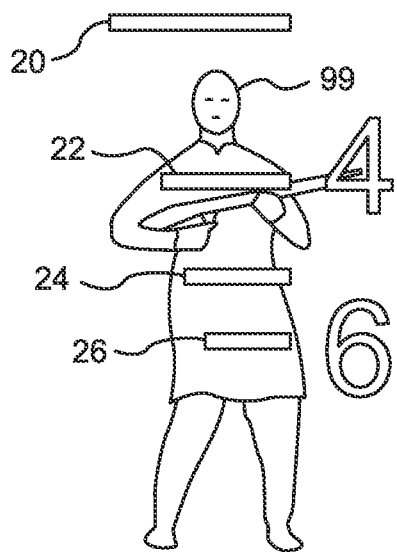
FIG. 8 is a front view of the magnifier reticle of FIG. 7 including an enemy combatant located behind the magnifier reticle in a standing position facing the magnifier reticle.

In another embodiment as shown in FIGS. 7 and 8, a magnifier reticle 10 similar as shown in FIG. 4 may further comprise one or more indicia operationally configured as one or more distance indicators 27 to assist a shooter in identifying the horizontal ranging distance of one or more horizontal first marks 20, 22, 24, 26 of a first scale 30. As an example, a magnifier reticle 10 incorporating the horizontal ranging distances of Table 4 may include one or more distance indicators 27 in the form of a number four (4) corresponding to horizontal first mark 22 and a number six (6) corresponding to horizontal first mark 26 wherein shoulder to shoulder ranging via the first mark 22 indicates ranging of an enemy combatant 99 at a distance of 400.0 yards and wherein shoulder to shoulder ranging via the first mark 26 indicates ranging of an enemy combatant 99 at a distance of 600.0 yards. As such, the number four (4) adjacent horizontal first mark 22 may be included as part of the magnifier reticle 10 to indicate to a shooter that horizontal first mark 22 equates to a distance of 400.0 yards from the magnifier reticle 10 for purposes of horizontal ranging. Likewise, the number six (6) adjacent horizontal first mark 26 may be included as part of the magnifier reticle 10 to indicate to a shooter that horizontal first mark 26 equate to a distance of 600.0 yards magnifier reticle 10 for purposes of horizontal ranging. In another embodiment, the number four hundred (400) may be used adjacent horizontal first mark 22 and the number six hundred (600) may be used adjacent horizontal first mark 26. In another embodiment, distance indicators may be used with horizontal first marks 20 and 24 rather than horizontal first marks 22 and 26, e.g., a magnifier reticle 10 may include a number three (3) corresponding to horizontal first mark 20 representing a distance of 300.0 yards and a number five (5) corresponding to horizontal first mark 24 representing a distance of 500.0 yards. In another embodiment, distance indicators may be used with a majority of the one or more horizontal first marks 20, 22, 24, 26 of a first scale 30. In another embodiment, distance indicators may be used with a minority of the one or more horizontal first marks 20, 22, 24, 26 of a first scale 30. In another embodiment, distance indicators may be used with each of the one or more horizontal first marks 20, 22, 24, 26 of a first scale 30. In another embodiment, roman numerals may be used as distance indicators. Also, actual words may be used as distance indicators, e.g., THREE, FOUR, FIVE, and SIX. In another embodiment, combinations of numbers, roman numerals, words, and/or other indicia may be used as distance indicators of a magnifier reticle 10.

Figure 9:
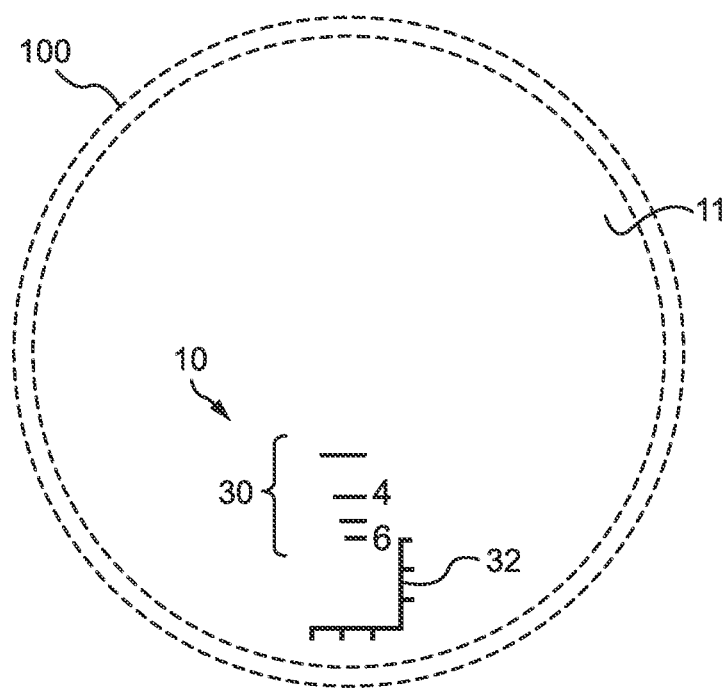
FIG. 9 is a front view of another embodiment of a magnifier reticle of the present disclosure.

Turning to FIG. 9, in another embodiment a magnifier reticle 10 of a magnifier 100 of this disclosure may include a second scale 32 operationally configured for use with the first scale 30 to vertically auto range one or more target objects 99 at one or more designated distances from the magnifier reticle 10 according to a known average height of one or more target objects 99. In one embodiment, the second scale 32 may be used as a lower alignment marker or bottom marker of a magnifier reticle 10 and the first scale 30 may be used as an upper alignment marker or top marker of the magnifier reticle 10. In particular, the second scale 32 is operationally configured as a vertical alignment marker for a lowermost part of one or more target objects 99 and the first scale 30 is operationally configured as a vertical alignment marker for an uppermost part of one or more target objects 99.

Figure 10:
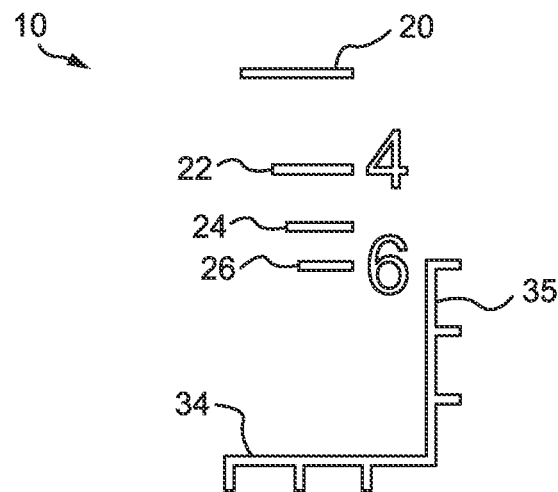
FIG. 10 is another front view of the magnifier reticle of FIG. 9.

As shown in FIG. 10, a second scale 32 may include a horizontal member or mark (hereafter "horizontal scale line 34") and a vertical member or mark (hereafter "vertical scale line 35") perpendicular to the horizontal scale line 34. In this embodiment, the horizontal scale line 34 and vertical scale line 35 meet to form a right angle as shown. In another embodiment, the horizontal scale line 34 and the vertical scale line 35 may intersect to form right angles. In another embodiment, the horizontal scale line 34 and vertical scale line 35 may be spaced apart in perpendicular alignment. In another embodiment, a second scale 32 may comprise only a horizontal scale line 34. As described below, in operation a lowermost portion of a target object 99 may be aligned with the horizontal scale line 34 and an uppermost portion of a target object 99 may be aligned with part of the first scale 30 to vertically auto range the target object 99 to determine the distance from the magnifier reticle 10 to the target object 99 according to the one or more ranging distances of the first scale 30.

Figure 11:
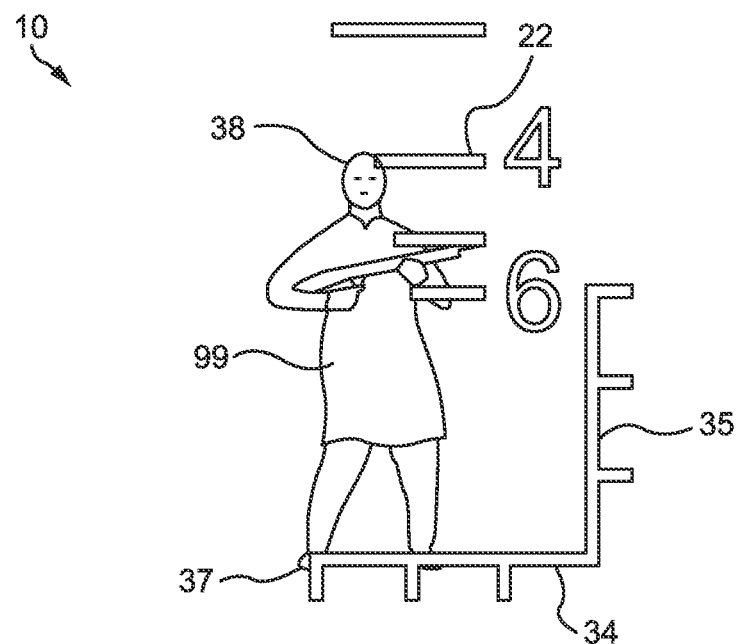
FIG. 11 is a front view of the magnifier reticle of FIG. 9 including an enemy combatant located behind the magnifier reticle in a standing position facing the magnifier reticle.
Figure 12:
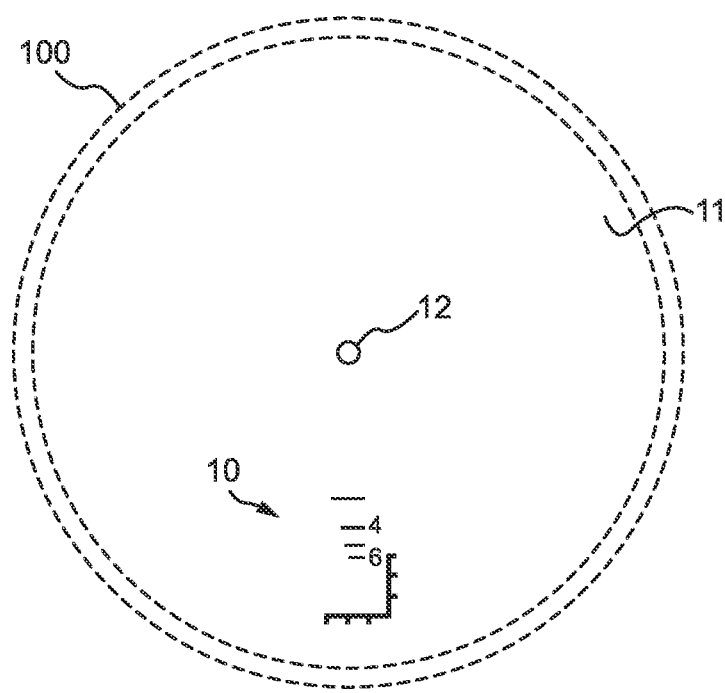
FIG. 12 is a demonstrative sight picture of an embodiment of a firearm sighting system of the present disclosure including the magnifier reticle of FIG. 9 and a front view of an embodiment of an optical reticle of an optical sight of the firearm sighting system.

Referring to FIG. 11, in an embodiment of the magnifier reticle 10 operationally configured to vertically auto range an enemy combatant 99 according to an average height of or about 1.79 m (about 70.0 inches), an enemy combatant 99 may be ranged vertically by locating the bottom of the feet 37 of the enemy combatant 99 behind or near the horizontal scale line 34 and locating the top of the head 38 of the enemy combatant 99 behind the first scale 30 as shown, wherein the location of the enemy combatant's head 38 relative the one or more horizontal first marks 20, 22, 24, 26 of the first scale 30 is operationally configured to determine the distance of the enemy combatant 99 from the magnifier reticle 10 according to the horizontal ranging distances for the one or more horizontal first marks 20, 22, 24, 26. In the illustration of FIG. 11, the top of the head 38 of the enemy combatant 99 is aligned with the first mark 22. In an embodiment of the magnifier reticle 10 incorporating the horizontal ranging distances of Table 4, the enemy combatant 99 of FIG. 11 is vertically ranged at a distance of or about 400.0 yards from the magnifier reticle 10. Although FIG. 11 illustrates an enemy combatant 10 facing the magnifier reticle 10, in another embodiment, the magnifier reticle 10 may be used to vertically auto range the enemy combatant 99 when the enemy combatant 99 is not directly facing the magnifier reticle 10, e.g., where an enemy combatant 99 is facing sideways relative the magnifier reticle 10 or facing directly away from the magnifier reticle 10 or facing another direction when standing upright. In addition, the magnifier reticle 10 of FIG. 10 may also be used as a ranging reticle in tandem with an optical reticle 12 of a corresponding optical sight 102. In one embodiment, a magnifier reticle 10 may be disposed on a lens 11 in a manner effective to produce a sight picture as shown in FIG. 12, which depicts an optical reticle 12 of an optical sight 102 behind the lens 11 of the magnifier 100 at a position above the magnifier reticle 10. In another embodiment, the location of the magnifier reticle 10 relative the optical reticle 12 may vary from the depiction of FIG. 12.

Figure 13:
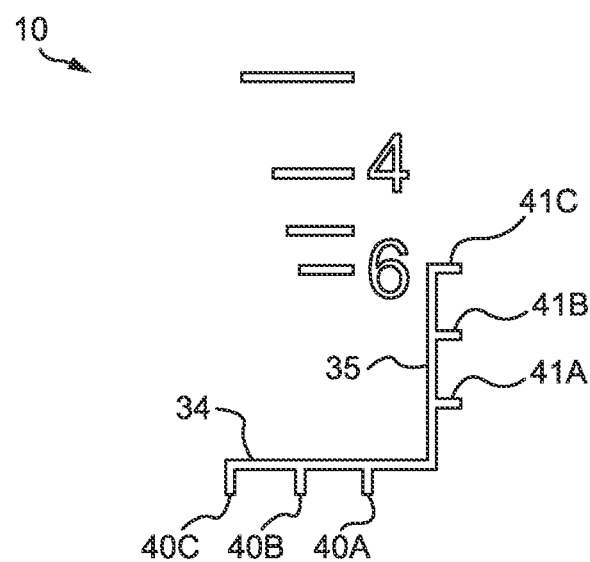
FIG. 13 is another front view of the magnifier reticle of FIG. 9.

With reference to FIG. 13, the horizontal scale line 34 and the vertical scale line 35 may further include one or more marks operationally configured for angular measurement of one or more target objects 99 for purposes of range estimation of the one or more target objects 99. For example, the horizontal scale line 34 may comprise one or more angular measurement marks including one or more vertical marks 40A, 40B, 40C and the vertical scale line 35 may comprise one or more angular measurement marks including one or more horizontal marks 41A, 41B, 41C as shown. In one embodiment, the one or more vertical marks 40A, 40B, 40C may be provided as MIL marks along the horizontal scale line 34 and the one or more horizontal marks 41A, 41B, 41C may be provided as MIL marks along the vertical scale line 35. In another embodiment, the one or more vertical marks 40A, 40B, 40C and the one or more horizontal marks 41A, 41B, 41C may be provided as MOA marks. Suitably, the configuration of a second scale 32 on a lens 11 of a magnifier 100 may be determined according to (1) a known average width of one or more target objects 99, (2) a known average height of one or more target objects 99, (3) a magnification number of the lens 11 of a magnifier 100, and (4) predetermined horizontal ranging distances for the first scale 30 of the magnifier reticle 10. Without limiting a magnifier 100 of this disclosure to a minimum fixed magnification, one suitable magnifier 100 may comprise a fixed magnification of 1.5× or more. Without limiting a magnifier 100 of this disclosure to a maximum fixed magnification, one suitable magnifier 100 may comprise a fixed magnification of 10.0× or less. As understood by the skilled artisan, one common fixed magnification number for commercially available firearm magnifiers is 3×, i.e., a 3× magnifier 100.

In one non-limiting embodiment, the one or more vertical marks 40A, 40B, 40C may be provided as 1.0 MIL, 2.0 MIL and 3.0 MIL marks respectively uniformly disposed along the horizontal scale line 34 operationally configured to assist horizontal range estimation of an enemy combatant 99 according to an average center mass of or about 0.46 m (18.0 inches) and the horizontal ranging distances for the first scale 30 of the magnifier reticle 30. Likewise, the one or more horizontal marks 41A, 41B, 41C may be provided as 1.0 MIL, 2.0 MIL and 3.0 MIL marks respectively uniformly disposed along the vertical scale line 35 operationally configured to assist vertical range estimation of an enemy combatant 99 according to an average height of or about 1.79 m (70.0 inches) and the horizontal ranging distances for the first scale 30 of the magnifier reticle 10. For example, with reference to FIG. 14, in one implementation of vertical range estimation of an enemy combatant 99 having an average height of or about 1.79 m (70.0 inches), the bottom of the feet 37 of the enemy combatant 99 may be located at or near the bottom of the horizontal scale line 34 and the head 38 of the enemy combatant 99 may be located along the one or more horizontal marks 41A, 41B, 41C whereby the location of the top of the head 38 of the enemy combatant 99 in relation to the one or more horizontal marks 41A, 41B, 41C provides an angular unit of measure in MILS used to calculate the distance from the magnifier reticle 10 to the enemy combatant 99 as described below. Suitably, the one or more horizontal marks 41A, 41B, 41C may be used to vertically range an enemy combatant 99 independent of the direction that the enemy combatant 99 is facing when being ranged.

Figure 14:
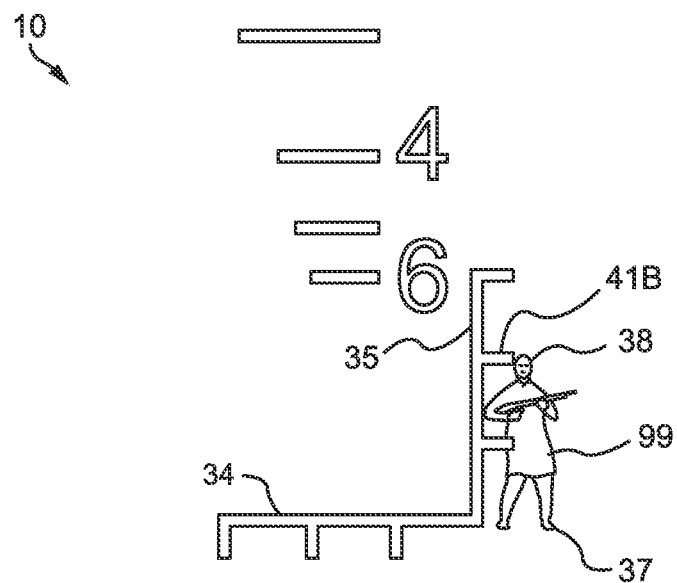
FIG. 14 is another front view of the magnifier reticle of FIG. 9 including an enemy combatant located behind the magnifier reticle in a standing position facing the magnifier reticle.

With further reference to FIG. 14, as described below the one or more vertical marks 40A, 40B, 40C and the one or more horizontal marks 41A, 41B, 41C may be spaced apart in a manner effective to range estimate one or more target objects 99 at distances beyond the horizontal ranging distances for the first scale 30 of the magnifier reticle 10. For example, in one embodiment of a magnifier reticle 10 including horizontal ranging distances for a first scale 30 as provided in Table 4, the following parameters may be employed for calculating the distance between a magnifier reticle 10 and an enemy combatant 99: (1) a first constant including an average height for an enemy combatant 99, e.g., average height of 1.79 m (70.0 inches); (2) a second constant including a conversion number of 27.78; and (3) a variable equal to the MILs covered by a vertically ranged enemy combatant 99 using the one or more horizontal marks 41A, 41B, 41C ("MIL count"). In this example, the average height of 70.0 inches is multiplied by the conversion number 27.78 and the product 1944.6 is divided by the MIL count. In the embodiment as shown in FIG. 14, the head 38 of the enemy combatant 99 is located at or about the two (2.0) MIL horizontal mark 41B. As such, the product 1944.6 is divided by the MIL count 2.0, which equals a distance of 889.1 m (972.3 yards) between the magnifier reticle 10 and the enemy combatant 99. The calculation described above is further expressed in the formula as shown in Table 6 below:

First Constant×Second Constant=Product/MIL count=Distance to Target Object 99.  Table 6

In an embodiment of the magnifier reticle 10 having the horizontal ranging distances for a first scale 30 of a magnifier reticle 10 as provided in Table 3 that is operationally configured to vertically range an enemy combatant 99 having an average height of or about 1.79 m (about 70.0 inches), the second constant includes a conversion number of 25.4 for use in calculating the Distance to Target Object 99 according to the formula of Table 6.

Figure 15:
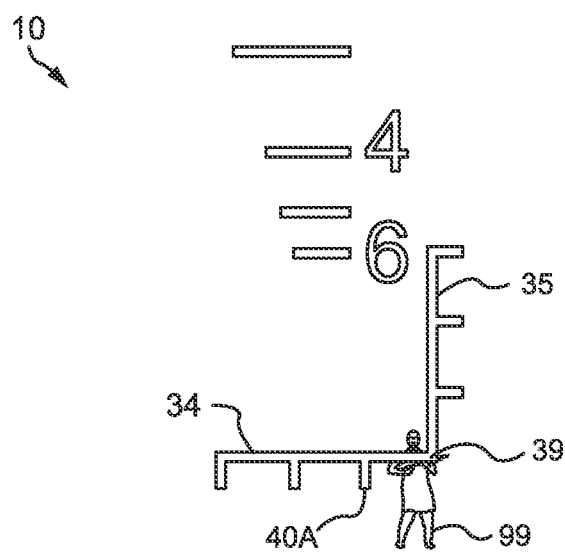
FIG. 15 is another front view of the magnifier reticle of FIG. 9 including an enemy combatant located behind the magnifier reticle in a standing position facing the magnifier reticle.

The magnifier reticle 10 as shown in FIG. 14 is also suitably operationally configured to horizontally range an enemy combatant 99 according to an average center mass of an enemy combatant 99 of or about 0.46 m (18.0 inches) wherein the one or more vertical marks 40A, 40B, 40C may be employed for acquiring the distance of the enemy combatant 99 from the magnifier reticle 10 by ranging the enemy combatant 99 horizontally shoulder to shoulder as shown in FIG. 15. In one non-limiting example, an enemy combatant 99 facing a magnifier reticle 10 may be ranged shoulder to shoulder by aligning the left shoulder of the enemy combatant 99 at or near a corner 39 of the second scale 32 where the horizontal scale line 34 and the vertical scale line 35 meet, whereby the location of the right shoulder of the enemy combatant 99 in relation to the one or more vertical marks 40A, 40B, 40C provides an angular unit of measure in MILs used to calculate the distance from the magnifier reticle 10 to the enemy combatant 99.

In the illustration of FIG. 15 including a magnifier reticle 10 comprising the horizontal ranging distances for the first scale 30 of the magnifier reticle 10 according to Table 4, the right shoulder of the enemy combatant 99 is aligned at or about a half-MIL (0.5) point from the one (1.0) MIL vertical mark 40A providing a MIL count of 0.5 whereby the following parameters may be employed for identifying the distance to the enemy combatant 99: (1) a first constant including an average center mass for an enemy combatant 99, e.g., 0.46 m (18.0 inches); (2) a second constant including a conversion number of 27.78; and (3) a variable equal to the MILs covered by the horizontally ranged enemy combatant 99 using the one or more vertical marks 40A, 40B, 40C, i.e., MIL count. Using the formula of Table 6, the average center mass of 18.0 inches is multiplied by the conversion number 27.78 and the product 500.04 is divided by the MIL count of 0.5, which equals a distance of or about 914.5 m (1000.08 yards) between the magnifier reticle 10 and the enemy combatant 99. Similar as described above in reference to FIG. 6, the one or more vertical mil marks 40A, 40B, 40C are also operationally configured to range one or more enemy combatants 99 oriented in a lying position.

Suitably, a magnifier reticle 10 as shown in FIGS. 13-15 is operationally configured for use in estimating a distance to any target object 99 when the target object 99 is of a known size. For example, in one embodiment a second scale 32 as shown in FIGS. 13-15 is operationally configured to provide a MIL reading for a particular target object 99 of a known size effective to calculate the distance between the target object 99 and the magnifier reticle 10. Using a magnifier reticle 10 as shown in FIGS. 13-15 according to the horizontal ranging distances for a first scale 30 as provided in Table 4, if a target object 99 having a known height of 2.54 m (100.0 inches) is vertically ranged at or about 3.0 MILS via horizontal mark 41C, the estimated distance from the magnifier reticle 10 to the target object 99 is or about 846.7 m (926.0 yards). Likewise, a magnifier reticle 10 as shown in FIGS. 13-15 is also operationally configured to MIL a target object 99 at a known distance effective to estimate the size of the target object 99. For example, using a magnifier reticle 10 as shown in FIGS. 13-15 according to the horizontal ranging distances for a first scale 30 as provided in Table 4, if a target object 99 located a known distance from the magnifier reticle 100 of 822.96 m (900.0 yards) is vertically ranged at or about 3.0 MILS via horizontal mark 41C, the estimated height of the target object 99 is or about 2.5 m (97.2 inches).

It is further contemplated that a magnifier reticle 10 of this disclosure may include one or more pre-set parameters including, but not necessarily limited to bullet drop compensation information ("BDC"), wind adjustment information, target travel lead information, and combinations thereof. As an example, the one or more vertical mil marks 40A, 40B, 40C and the one or more horizontal mil marks 41A, 41B, 41C of the second scale 32 may be used as marks for purposes of BDC, wind adjustment information, target travel lead information, and combinations thereof.

Figure 16:
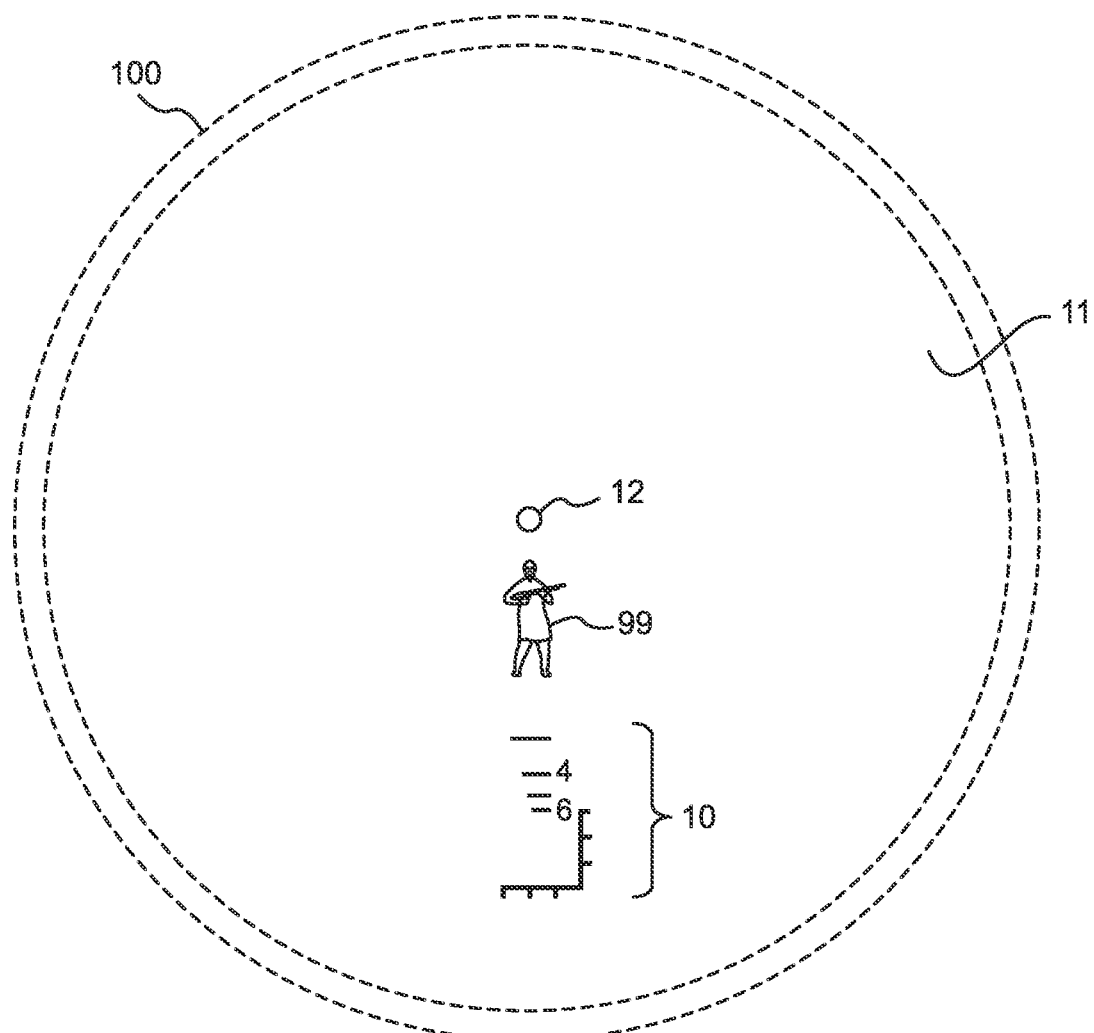
FIG. 16 is a demonstrative sight picture of a firearm sighting system of the present disclosure including the magnifier reticle of FIG. 9, a front view of an embodiment of an optical reticle of an optical sight of the firearm sighting system and an enemy combatant in a standing position located behind the magnifier reticle and the optical reticle facing the magnifier reticle.

In operation, once a target object 99 is ranged, a shooter can then employ a second reticle 12 of a corresponding optical sight 102 and take aim at the target object 99 using the second reticle 12 according to the range estimation of the target object 99 realized via the corresponding magnifier reticle 10. For example, in an embodiment of a firearm sighting system including an optical sight 102 zeroed at 100.0 yards and the magnifier reticle 10 of FIG. 11 comprising the horizontal ranging distances as described in Table 4, once an enemy combatant 99 is vertically ranged as shown in FIG. 11, e.g., vertically ranged at or about 400.0 yards, a shooter may holdover the second reticle 12 to locate the second reticle 12 at a point above the enemy combatant 99 to adjust for gravitational forces at a distance of 400.0 yards as shown in FIG. 16. As understood by the skilled artisan, the amount of holdover when aiming a firearm 105 at an enemy combatant 99 may depend on the firearm/ammo combination used.

Figure 17:
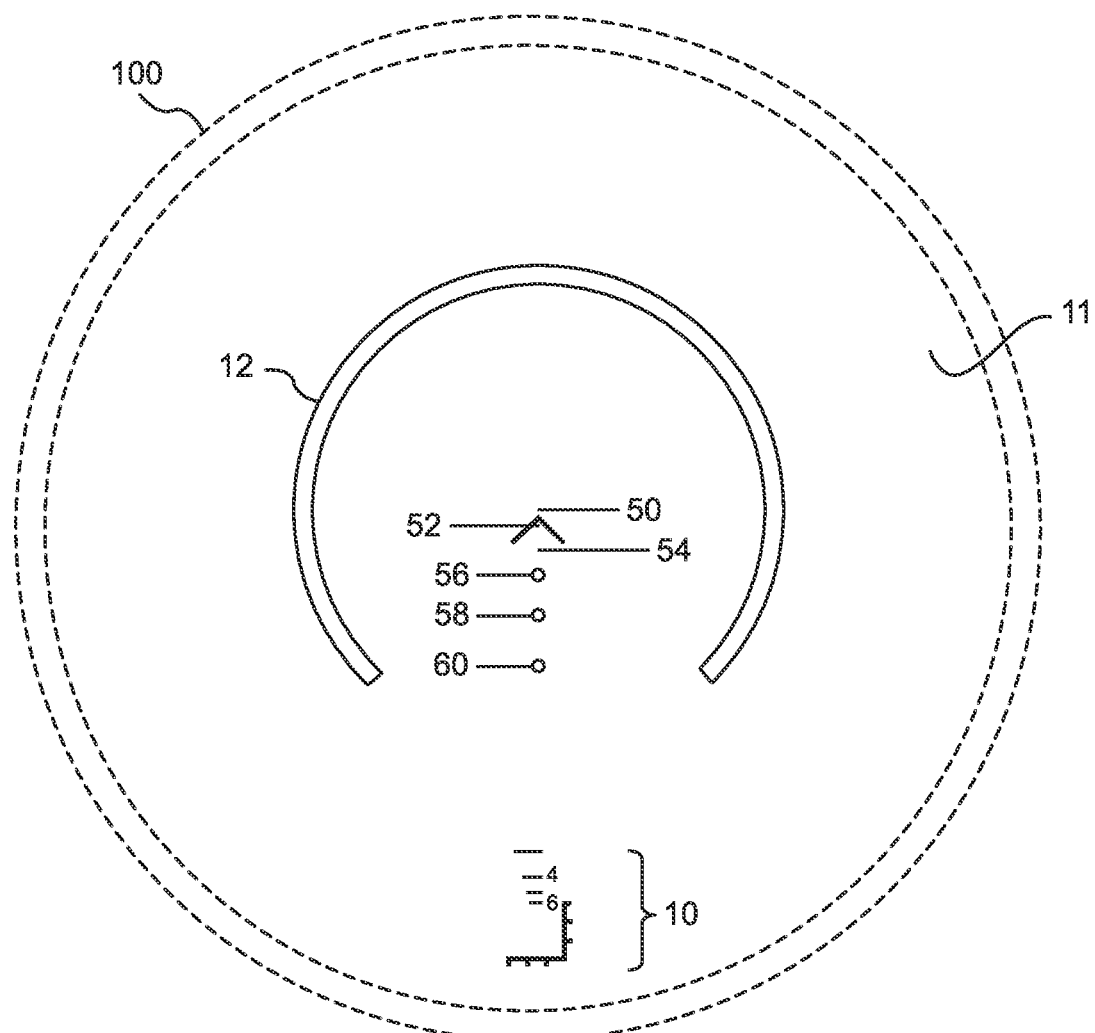
FIG. 17 is a demonstrative sight picture of a firearm sighting system of the present disclosure including the magnifier reticle of FIG. 9 and a front view of an embodiment of an optical reticle of an optical sight of the firearm sighting system.

In another embodiment, a second reticle 12 may include a configuration as shown in the embodiment of FIG. 17, which includes a second reticle 12 referred to as the ACSS® CQB reticle commercially available from Primary Arms, L.L.C., Houston, Tex., U.S.A. In an embodiment wherein the second reticle 12 is zeroed at 100.0 yards and operationally configured for use with a 5.56/.223 cartridge, the second reticle 12 may include bullet drop compensation as shown in FIG. 17 and as described in Table 7 below.

TABLE 7

| Bullet Drop Compensation ("BDC") Mark | Distance (yards) |
|---|---|
| BDC Mark 50 | 100.0 |
| BDC Mark 52 | 200.0 |
| BDC Mark 54 | 300.0 |
| BDC Mark 56 | 400.0 |
| BDC Mark 58 | 500.0 |
| BDC Mark 60 | 600.0 |

Figure 18:
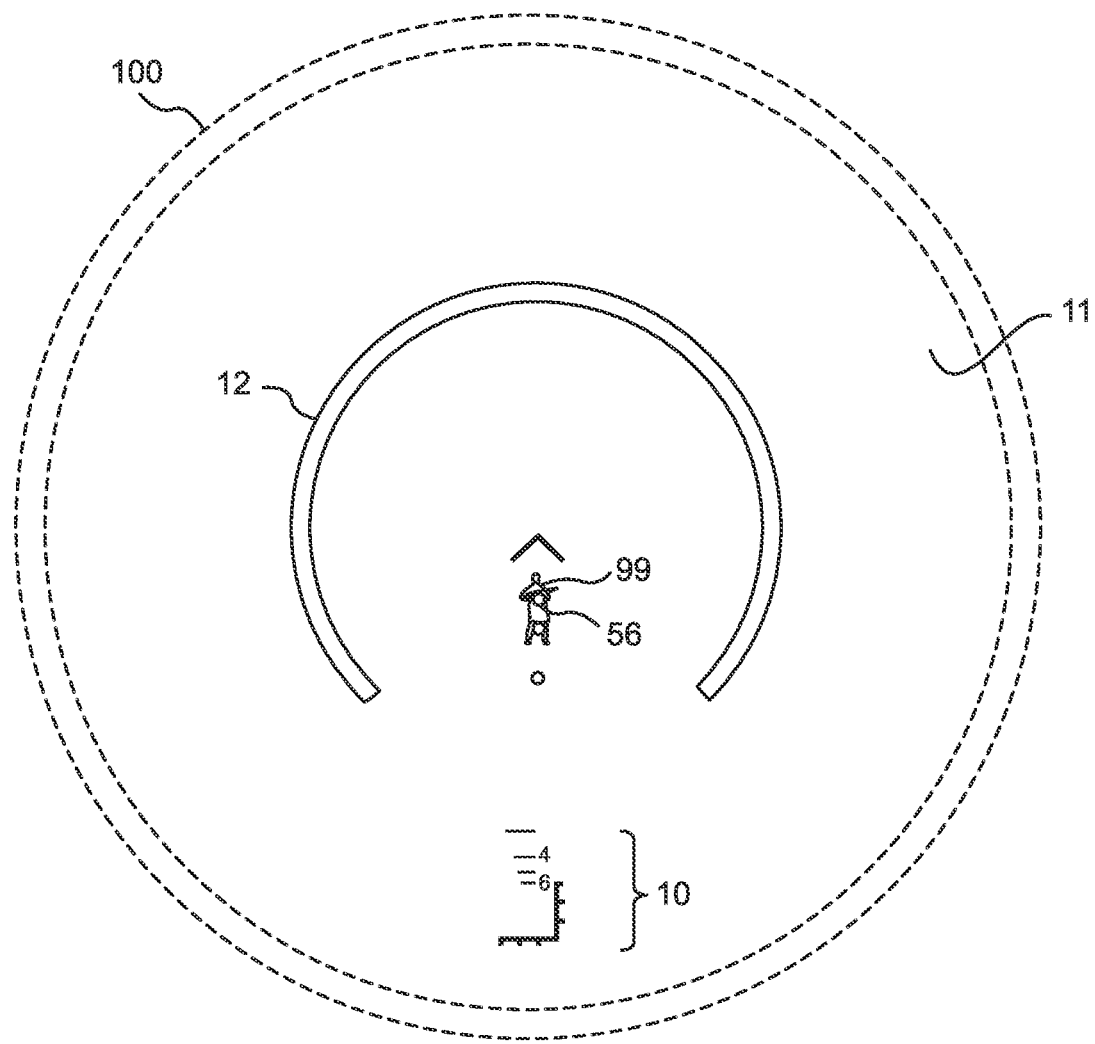
FIG. 18 is a demonstrative sight picture of a firearm sighting system of the present disclosure including the magnifier reticle of FIG. 9, the optical reticle of FIG. 17 and an enemy combatant in a standing position located behind the magnifier reticle and the optical reticle facing the magnifier reticle.
Figure 19:
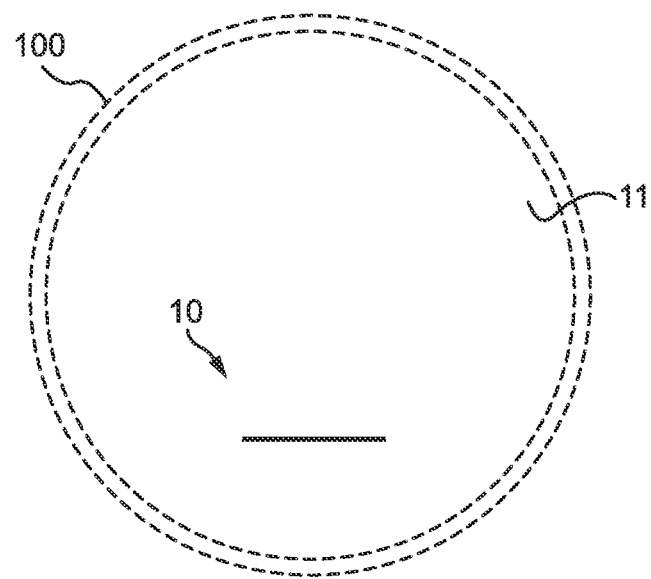
FIG. 19 is a front view of an embodiment of a magnifier reticle of the present disclosure within a demonstrative sight picture.
Figure 20:
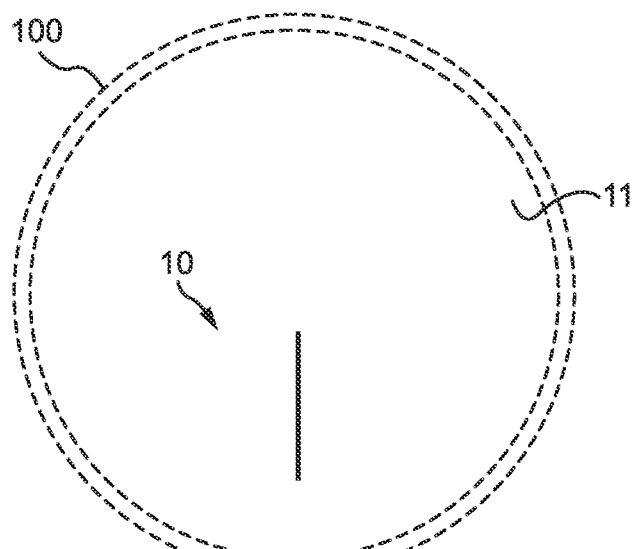
FIG. 20 is a front view of an embodiment of a magnifier reticle of the present disclosure within a demonstrative sight picture.
Figure 21:
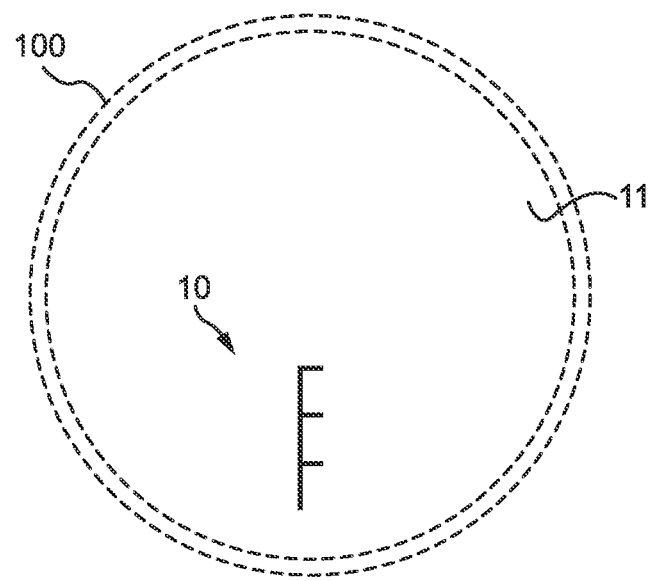
FIG. 21 is a front view of an embodiment of a magnifier reticle of the present disclosure within a demonstrative sight picture.
Figure 22:
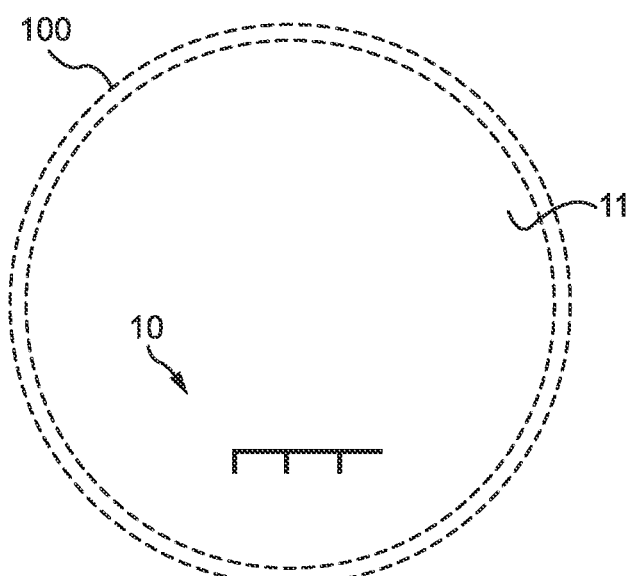
FIG. 22 is a front view of an embodiment of a magnifier reticle of the present disclosure within a demonstrative sight picture.
Figure 23:
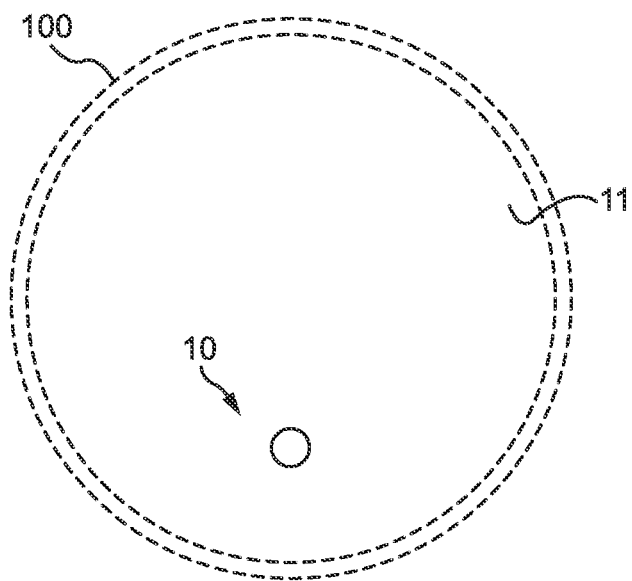
FIG. 23 is a front view of an embodiment of a magnifier reticle of the present disclosure within a demonstrative sight picture.
Figure 24:
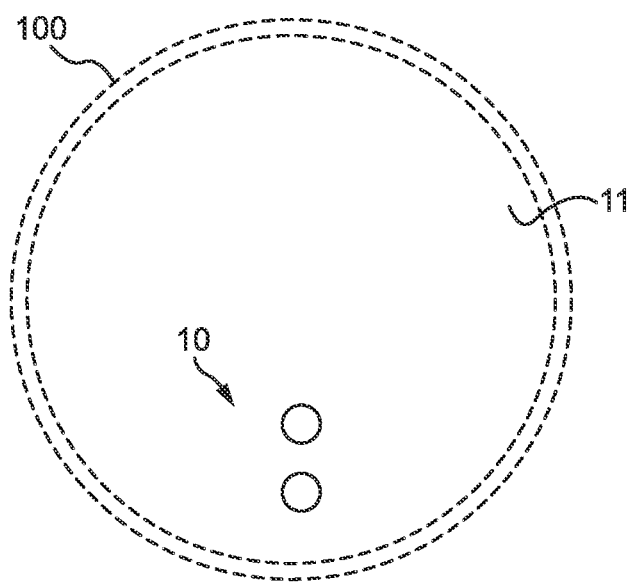
FIG. 24 is a front view of an embodiment of a magnifier reticle of the present disclosure within a demonstrative sight picture.
Figure 25:
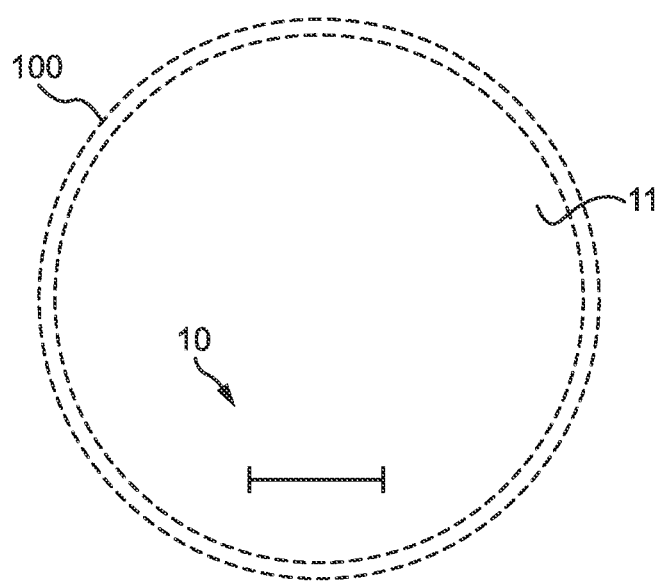
FIG. 25 is a front view of an embodiment of a magnifier reticle of the present disclosure within a demonstrative sight picture.
Figure 26:
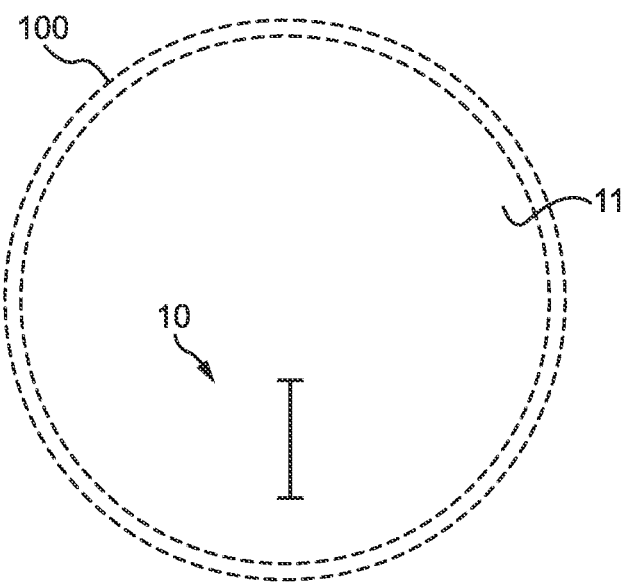
FIG. 26 is a front view of an embodiment of a magnifier reticle of the present disclosure within a demonstrative sight picture.
Figure 27:
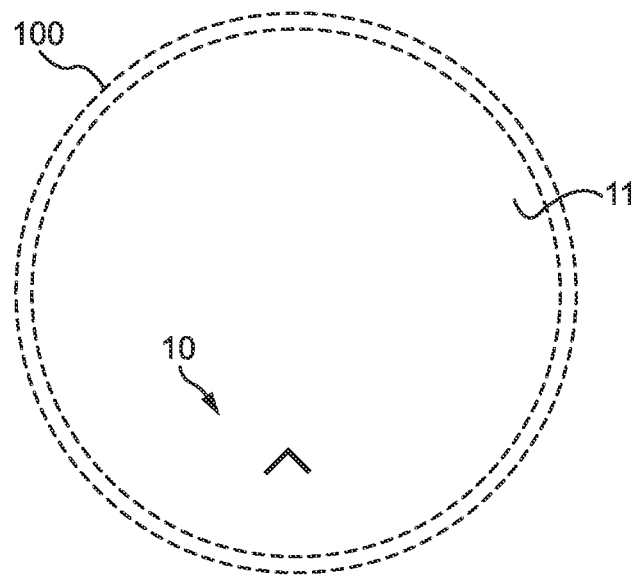
FIG. 27 is a front view of an embodiment of a magnifier reticle of the present disclosure within a demonstrative sight picture.
Figure 28:
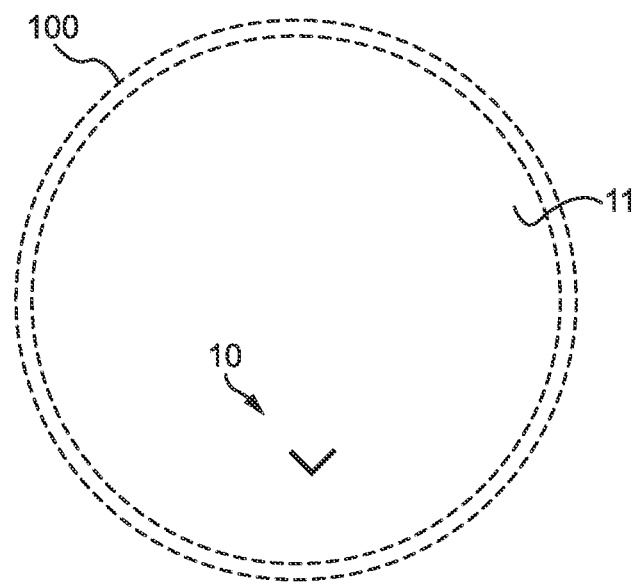
FIG. 28 is a front view of an embodiment of a magnifier reticle of the present disclosure within a demonstrative sight picture.
Figure 29:
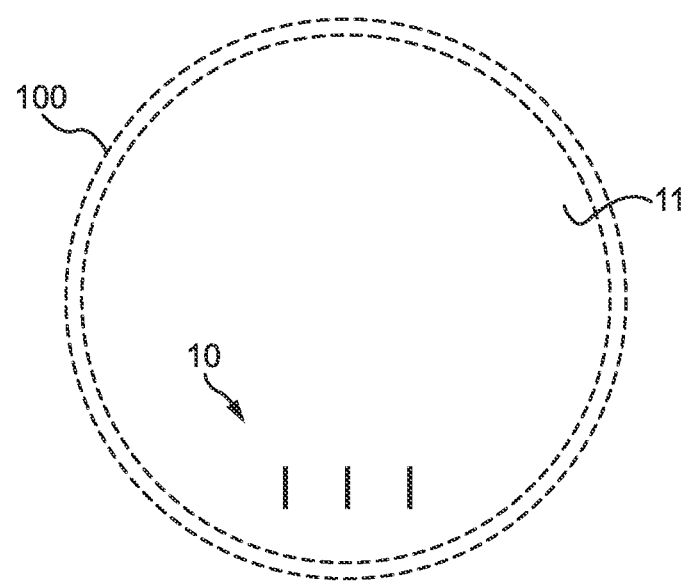
FIG. 29 is a front view of an embodiment of a magnifier reticle of the present disclosure within a demonstrative sight picture.
Figure 30:
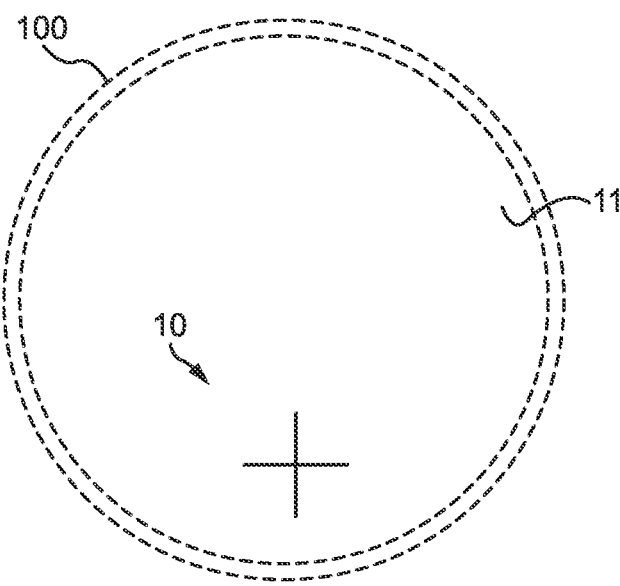
FIG. 30 is a front view of an embodiment of a magnifier reticle of the present disclosure within a demonstrative sight picture.
Figure 31:
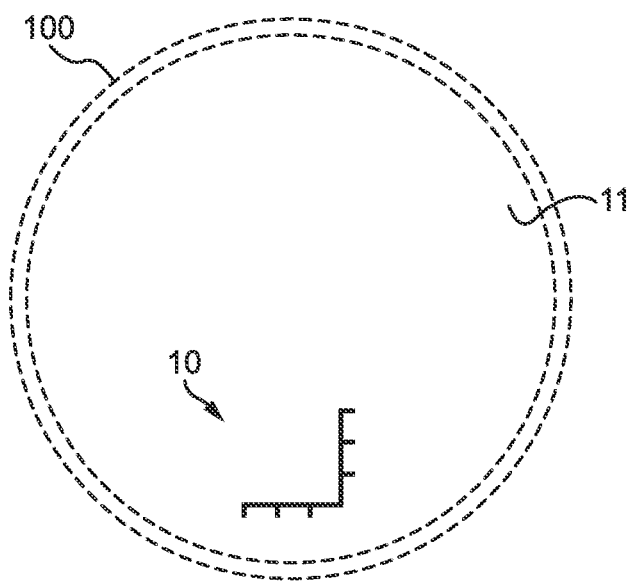
FIG. 31 is a front view of an embodiment of a magnifier reticle of the present disclosure within a demonstrative sight picture.
Figure 32:
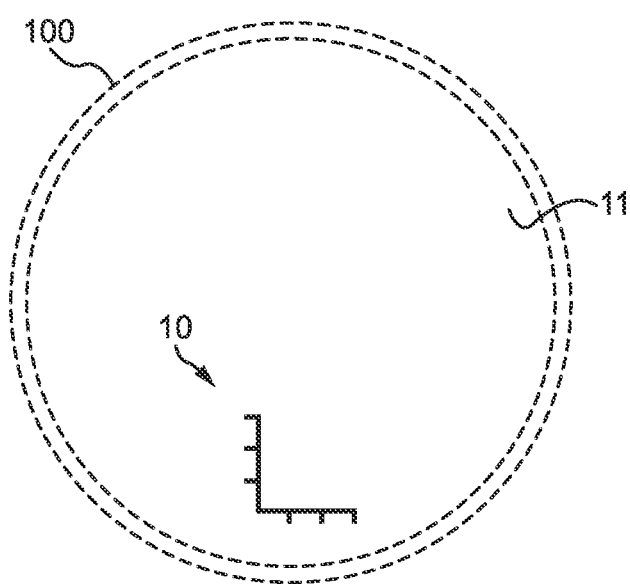
FIG. 32 is a front view of an embodiment of a magnifier reticle of the present disclosure within a demonstrative sight picture.
Figure 33:
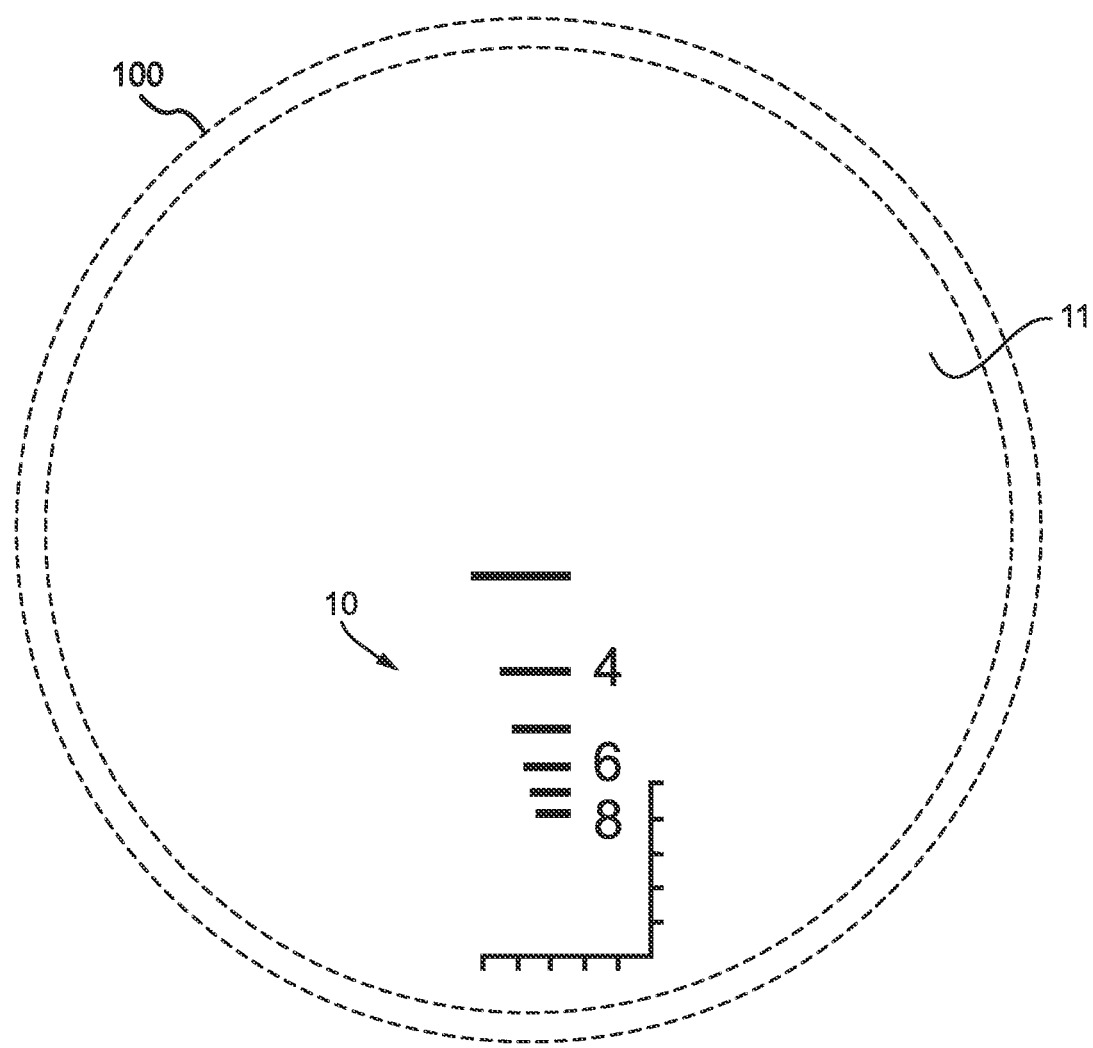
FIG. 33 is a front view of an embodiment of a magnifier reticle of the present disclosure within a demonstrative sight picture.

In this embodiment, once a target object 99 is ranged via the magnifier reticle 10 the second reticle 12 may be used to aim at the target object 99. For example, an enemy combatant 99 originally ranged at 400.0 yards via the magnifier reticle 10 as shown in FIG. 11 may be targeted using the BDC Mark 56 as an aiming point as shown in FIG. 18.

Operation of a magnifier reticle 10 of a magnifier 100 of this disclosure is suitably determined according to the configuration or layout of indicia of the magnifier reticle 10, including the set size(s) of individual indicia and spacing there between. The size and spacing of a magnifier reticle 10 of this disclosure may be determined by one or more intended average sizes for one or more target objects 99 in angular measurement, e.g., an intended width and/or intended height for one or more target objects in MILs or MOA, at one or more desired distances. Once the angular measurements of the magnifier reticle 10 are established, the focal length of the magnifier reticle 10 may be used to determine the non-magnified dimensions of the magnifier reticle 10 on a lens 11 of a magnifier 100 in metric units or U.S. units, e.g., millimeters or inches. Without limiting the disclosure, a magnifier reticle 10 as described herein may be provided in a size ranging from or about 5.0 mm to or about 10.0 in maximum height and/or width. As understood by the skilled artisan, a magnifier reticle 10 may be etched onto a lens 11 of a magnifier 100 using a reticle plate comprising one or more apertures there through operationally configured to determine the size of the magnifier reticle 10 on the lens 11.

Moreover, depending on the characteristics of a particular firearm and/or cartridge utilizing a firearm sighting system of this disclosure, a second reticle 12 may be set to aim at one or more target objects 99 at one or more particular distances as desired. As understood by the skilled artisan, an optical sight 102 of the present disclosure employs basic perspective principles known in the art. In addition, a magnifier reticle 10 employed for a particular use or operation is not limited in size, shape or ornamental configuration. In addition to the embodiments described above, other non-limiting examples of magnifier reticle 10 indicia may include, but are not necessarily limited to one or more chevrons, one or more circular shape marks such as one or more dots and/or one or more circles, one or more triangles or pyramids, one or more ovals, one or more arrows, one or more rectangles, one or more inverted chevrons, one or more inverted triangles or pyramids, one or more vertical lines, one or more horizontal lines, one or more diagonal lines, one or more curved lines, one or more irregular shapes, one or more crosshair or "+" marks, one or more "X" marks, one or more "T" marks, one or more inverted "T" marks, one or more other indicia comprising interconnected lines, and combinations thereof. In addition, the one or more indicia of a magnifier reticle 15 may be provided as solid indicia or provided empty with borders of solid lines and/or broken lines and/or as a collection of dots or other marks. For purposes of illustration, additional non-limiting examples of magnifier reticle 10 configurations are provided in FIGS. 19-33.

A suitable magnifier 100 of this disclosure includes at least one lens 11 for fixed magnification of an image, the lens 11 including a magnifier reticle 10. As stated above, a magnifier reticle 10 may be etched directly onto a lens 11. In another embodiment, a magnifier reticle 10 may include fibers and/or other materials such as filaments and the like embedded within a lens 11 of the magnifier 100. Suitable other magnifier reticle 10 materials include, but are not necessarily limited to metals, plastics, fiber optic strand type materials, and combinations thereof.

It is further contemplated that a magnifier 100 of this disclosure may include a variable power magnifier, e.g., a magnifier having 1×-6× magnification. In an embodiment including a first-focal-plane magnifier 100 a magnifier reticle 10 as described above is operationally configured for use at any magnification number, e.g., 1×-6×. In an embodiment including a second-focal-plane magnifier 100 a magnifier reticle 10 as described above is operationally configured for use at the highest magnification number of the magnifier 100, e.g., 6×.

Figure 34:
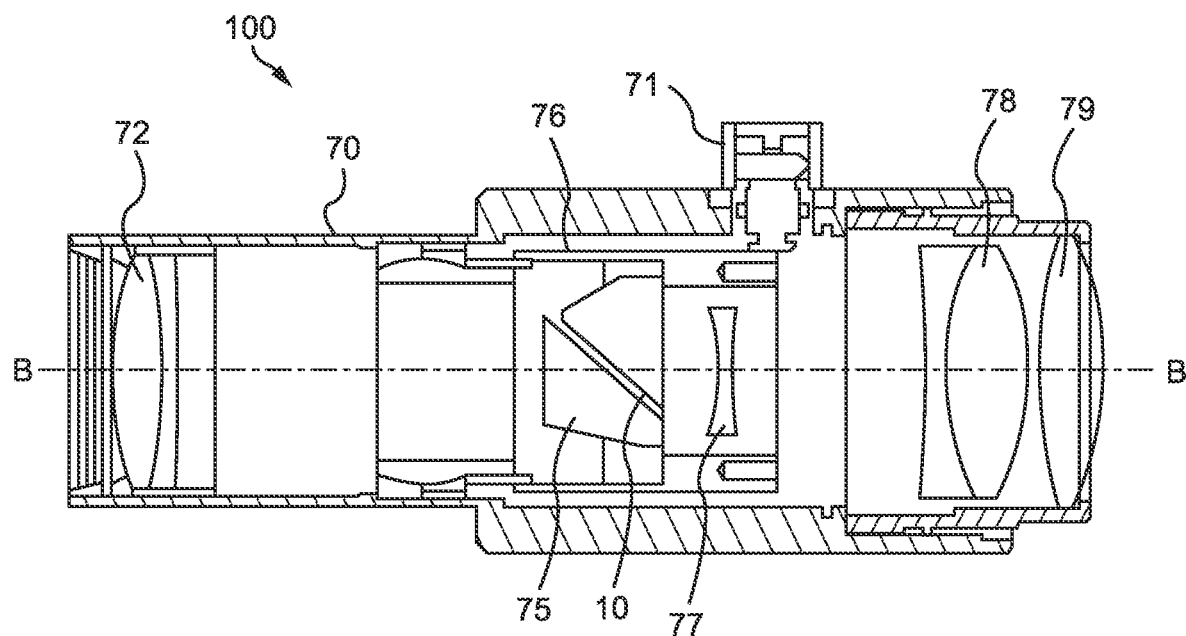
FIG. 34 is a side sectional view of an exemplary magnifier of the present disclosure.
Figure 35:
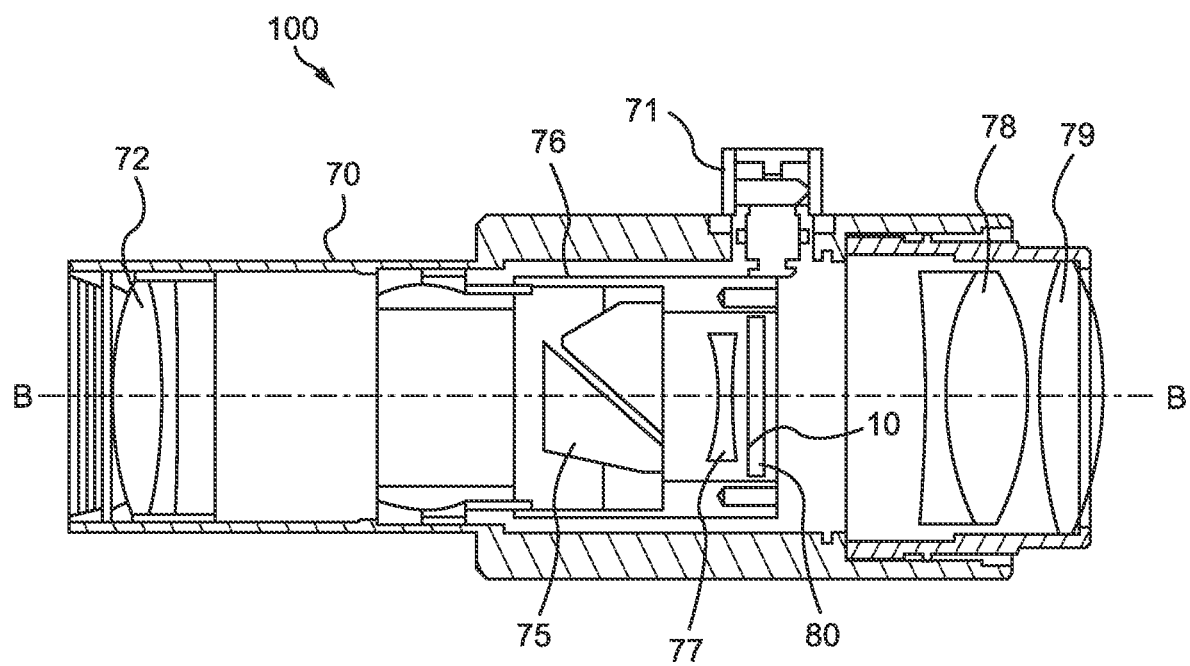
FIG. 35 is a side sectional view of an exemplary magnifier of the present disclosure.

Although a magnifier reticle 10 of this disclosure is operationally configured for use with various types of magnifiers, one suitable type of magnifier 100 includes a prism magnifier, e.g., a roof prism. One non-limiting example of a magnifier 100 of this disclosure is provided in FIG. 34. In this embodiment, the magnifier 100 includes an outer housing 70 defined by optical axis B-B, an image adjustment system 71 operationally configured to center a magnified aiming point inside the field of view of the magnifier 100, an objective lens assembly 72 comprising one or more lenses, a prism lens assembly 75 including a plurality of prism lenses located within a pivot tube 76, an image erector lens 77, an eyepiece lens assembly including one or more lenses operationally configured as a collimator assembly for focusing and magnifying an image and an optical reticle 12 to a shooter's eye (see first eyepiece lens 78 and a second eyepiece lens 79). In one embodiment, a magnifier reticle 10 may be etched directly onto a prism lens of the prism lens assembly 75. In another embodiment, a magnifier 100 may include an additional lens 80 disposed between the image erector lens 77 and the eyepiece lens assembly wherein a magnifier reticle 10 may be etched directly onto the additional lens 80 as shown in FIG. 35.

The disclosure will be better understood with reference to the following non-limiting example, which is illustrative only and not intended to limit the present disclosure to a particular embodiment.

Example 1

In a first non-limiting example, a magnifier 100 comprising a reticle 10 as shown in FIGS. 2, 7, 9, 19-33 may be described as provided in the following three paragraphs.

A firearm magnifier comprising a reticle.

A firearm magnifier of a firearm sighting system, comprising a reticle operationally configured to range one or more target objects in a manner effective to determine an aiming point of a reticle of an optical sight of the firearm sighting system for the one or more target objects.

A firearm magnifier comprising a reticle operationally configured to auto range one or more targets at one or more distances from the reticle.

Terms and phrases used herein, and variations thereof, unless otherwise expressly stated, should be construed as open-ended as opposed to limiting. As examples of the foregoing: the term "including" should be read as meaning "including, without limitation" or the like, the term "example" is used to provide exemplary instances of the item in discussion, not an exhaustive or limiting list thereof, the terms "a" or "an" should be read as meaning "at least one," "one or more," or the like. The presence of broadening words and phrases such as "one or more," "at least," "but not limited to" or other like phrases in some instances shall not be read to mean that the narrower case is intended or required in instances where such broadening phrases might be absent.

It is believed that present disclosure and advantages will be understood by the foregoing description. Persons of ordinary skill in the art will recognize that many modifications may be made to the present disclosure without departing from the spirit and scope of the invention. The embodiment(s) described herein are meant to be illustrative only and should not be taken as limiting the invention, which is defined in the claims.

I claim:

1. A firearm magnifier operationally configured to magnify an image in a field of view of a firearm non-magnifying (1×) electronic optical sight having an aiming reticle, the firearm magnifier comprising:
    a lens including an auto ranging reticle on the lens;
    wherein the firearm magnifier includes an optical axis at the center of the lens and the auto ranging reticle is located at a non-axial position below a center point of the lens;
    wherein the auto ranging reticle includes a first scale comprising multiple horizontal marks spaced apart non-uniformly and a second scale including a horizontal member located below the first scale and a vertical member perpendicular to the horizontal member;
    wherein each of the horizontal marks comprises a distinct width and a distinct distance from the horizontal member of the second scale;
    wherein the horizontal member of the second scale comprises angular measurement marks uniformly disposed along the horizontal member:
    wherein the vertical member of the second scale comprises angular measurement marks uniformly disposed along the vertical member;
    wherein at least part of the vertical member of the second scale is located at a point higher on the lens than at least part of the first scale; and
    wherein no marks are located at or above the optical axis of the lens.

2. The firearm magnifier of claim 1 wherein the horizontal marks are operationally configured to horizontally auto range one or more target objects in the field of view at one or more designated distances from the auto ranging reticle according to a known average size for the one or more target objects.

3. The firearm magnifier of claim 2 wherein the horizontal member of the second scale is operationally configured as a lower alignment mark for the one or more target objects and the first scale is operationally configured as an upper alignment mark for the one or more target objects effective to vertically auto range the one or more target objects at the one or more designated distances from the auto ranging reticle.

4. The firearm magnifier of claim 3 wherein the angular measurement marks of the horizontal member of the second scale and the angular measurement marks of the vertical member of the second scale are MIL marks.

5. The firearm magnifier of claim 1 wherein the angular measurement marks of the horizontal member of the second scale are operationally configured for horizontal measuring of one or more target objects and the angular measurement marks of the vertical member of the second scale are operationally configured for vertical measuring of the one or more target objects.

6. The firearm magnifier of claim 3 wherein the angular measurement marks of the horizontal member of the second scale and the angular measurement marks of the vertical member of the second scale are MOA marks.

7. The firearm magnifier of claim 2 wherein the width of each of the horizontal marks corresponds to a designated distance of the one or more designated distances for the one or more target objects from the auto ranging reticle.

8. The firearm magnifier of claim 1 wherein the horizontal marks of the first scale are operationally configured to horizontally auto range one or more target objects in the field of view, the horizontal marks including a first horizontal mark defining a minimum horizontal auto ranging distance of the auto ranging reticle and a second horizontal mark defining a maximum horizontal ranging distance of the auto ranging reticle.

9. The firearm magnifier of claim 8 wherein the first horizontal mark is an uppermost horizontal mark of the auto ranging reticle.

10. The firearm magnifier of claim 3 wherein the horizontal marks are operationally configured to auto range the one or more target objects in U.S. units.

11. The firearm magnifier of claim 3 wherein the horizontal marks are operationally configured to auto range the one or more target objects in metric units.

12. The firearm magnifier of claim 1 wherein the firearm magnifier comprises a fixed magnification of 1.5× or more.

13. A firearm magnifier of a firearm sighting system including a non-magnifying (1×) electronic optical sight having an aiming reticle, the firearm magnifier comprising:
    a lens including a magnifier reticle on the lens;
    wherein the firearm magnifier includes an optical axis at the center of the lens and the magnifier reticle is located at a non-axial position below a center point of the lens;
    wherein the magnifier reticle includes a first scale comprising multiple horizontal marks spaced apart non-uniformly and a second scale including a horizontal member located below the first scale and a vertical member perpendicular to the horizontal member;
    wherein each of the horizontal marks comprises a distinct width and a distinct distance from the horizontal member of the second scale;
    wherein the horizontal member of the second scale comprises angular measurement marks uniformly disposed along the horizontal member:
    wherein the vertical member of the second scale comprises angular measurement marks uniformly disposed along the vertical member;

wherein at least part of the vertical member of the second scale is located at a point higher on the lens than at least part of the first scale;

wherein no marks are located at or above the optical axis; and wherein when the firearm magnifier is mounted to a firearm behind the non-magnifying (1×) electronic optical sight then the magnifier reticle is operationally configured to auto range one or more targets in a field of view of the non-magnifying (1×) electronic optical sight to determine an aiming point of the aiming reticle for the one or more targets.

14. The firearm magnifier of claim 13 wherein the firearm magnifier comprises a fixed magnification of 1.5× or more.

15. A firearm magnifier operationally configured to magnify an image in a field of view of a firearm non-magnifying (1×) electronic optical sight having an aiming reticle, the firearm magnifier comprising:

a lens including a reticle on the lens;

wherein the firearm magnifier includes an optical axis located at a center of the lens and the reticle is located at a non-axial position below a center point of the lens;

wherein the reticle includes a first scale comprising a plurality of horizontal marks spaced apart non-uniformly and a second scale including a horizontal member located below the first scale and a vertical member perpendicular to the horizontal member;

wherein each of the horizontal marks comprises a distinct width and a distinct distance from the horizontal member of the second scale;

wherein the horizontal member of the second scale comprises angular measurement marks uniformly disposed along the horizontal member:

wherein the vertical member of the second scale comprises angular measurement marks uniformly disposed along the vertical member;

wherein at least part of the vertical member of the second scale is located at a point higher on the lens than at least part of the first scale;

wherein no marks are located at or above the optical axis; and wherein the reticle is operationally configured to auto range one or more targets in the field of view at one or more distances from the reticle.

16. The firearm magnifier of claim 15 wherein the horizontal marks are operationally configured to auto range the one or more target objects according to a known average width for the one or more target objects.

17. The firearm magnifier of claim 15 wherein the horizontal member of the second scale is operationally configured as a lower alignment mark for the one or more target objects and the first scale is operationally configured as an upper alignment mark for the one or more target objects effective to vertically auto range the one or more target objects at the one or more designated distances from the auto ranging reticle.

* * * * *